United States Patent
Sills et al.

(10) Patent No.: US 10,336,543 B1
(45) Date of Patent: Jul. 2, 2019

(54) SELECTIVE ENCODING OF PACKAGES

(71) Applicant: Wing Aviation LLC, Mountain View, CA (US)

(72) Inventors: Maxwell Andrew Sills, San Francisco, CA (US); Ian Wetherbee, San Jose, CA (US); Robert Samuel Gordon, San Bruno, CA (US)

(73) Assignee: Wing Aviation LLC, Mountain View, CA (US)

( * ) Notice: Subject to any disclaimer, the term of this patent is extended or adjusted under 35 U.S.C. 154(b) by 394 days.

(21) Appl. No.: 15/394,568

(22) Filed: Dec. 29, 2016

Related U.S. Application Data

(60) Provisional application No. 62/281,656, filed on Jan. 21, 2016.

(51) Int. Cl.
| | |
|---|---|
| *B65G 1/137* | (2006.01) |
| *B64C 39/02* | (2006.01) |
| *B64D 1/22* | (2006.01) |
| *G05D 1/00* | (2006.01) |
| *B65G 1/04* | (2006.01) |
| *G06Q 10/08* | (2012.01) |

(52) U.S. Cl.
CPC .......... *B65G 1/1373* (2013.01); *B64C 39/024* (2013.01); *B64D 1/22* (2013.01); *B65G 1/0492* (2013.01); *G05D 1/0027* (2013.01); *G06Q 10/087* (2013.01); *B65G 2203/0216* (2013.01); *B65G 2203/046* (2013.01)

(58) Field of Classification Search
None
See application file for complete search history.

(56) References Cited

U.S. PATENT DOCUMENTS

| | | | |
|---|---|---|---|
| 8,989,922 B2* | 3/2015 | Jones | G05D 1/102 701/22 |
| 9,964,951 B1* | 5/2018 | Dunn | B64C 39/024 |
| 10,029,787 B1* | 7/2018 | Lesser | B64C 39/024 |
| 2014/0254896 A1* | 9/2014 | Zhou | B25J 9/0006 382/124 |
| 2014/0344118 A1 | 11/2014 | Parpia et al. | |
| 2015/0123771 A1 | 5/2015 | Otto et al. | |
| 2015/0266577 A1* | 9/2015 | Jones | G05D 1/102 701/3 |

(Continued)

*Primary Examiner* — Shelley Chen
(74) *Attorney, Agent, or Firm* — McDonnell Boehnen Hulbert & Berghoff LLP

(57) ABSTRACT

Systems and methods are provided for worksite automation. One example method includes receiving a work request indicative of at least one of a first item or one or more work request parameters, where the first item is one of a plurality of items stored in an item-storage environment, and where each item is associated with a co-located identifier device; in response to receipt of the work request: identifying the first item; determining a target location corresponding to the first item; selecting an unmanned aerial vehicle (UAV) from a plurality of encoder UAVs in the item-storage environment, where each encoder UAV includes an encoder device configured to encode data to the identifier devices associated with the plurality of items; and causing the selected UAV to: (a) travel to the target location, and (b) while hovering near to the location, encode particular identification data to the device associated with the first item.

23 Claims, 12 Drawing Sheets

(56) References Cited

U.S. PATENT DOCUMENTS

| | | | |
|---|---|---|---|
| 2016/0185466 A1* | 6/2016 | Dreano, Jr. | G06Q 30/0635 |
| | | | 705/26.81 |
| 2016/0247115 A1* | 8/2016 | Pons | G06Q 10/087 |
| 2018/0101817 A1* | 4/2018 | Lection | G06Q 10/0832 |
| 2018/0229843 A1* | 8/2018 | Costanzo | B64C 27/04 |

* cited by examiner

SELECTIVE ENCODING OF PACKAGES

CROSS-REFERENCE TO RELATED APPLICATIONS

This application claims priority to U.S. Patent App. No. 62/281,656, entitled "Selective Magnetization of Packages", filed Jan. 21, 2016, the contents of which are fully incorporated by reference herein for all purposes.

BACKGROUND

Unless otherwise indicated herein, the materials described in this section are not prior art to the claims in this application and are not admitted to be prior art by inclusion in this section.

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems. Such machines or vehicles may be referred to as unmanned vehicles.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode. Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present disclosure provides systems and processes that may provide for automation selective encoding of identifier devices associated with items stored in an item-storage environment. In particular, a system may receive an order including one or more ordered items. Accordingly, one or more UAVs may fly near to the ordered items and may encode the order data to the identifier device associated with each of the ordered items. The respective identifier device associated with an ordered item may be attached to the item. Accordingly, the order data may be read from the identifier device to rapidly locate the ordered items, and to quickly process and fulfill the order.

In one example, a computer-implemented method is provided that includes receiving a work request indicative of at least one of: a first item or one or more work request parameters, where the first item is one of a plurality of items stored in an item-storage environment, and where each item is associated with a co-located identifier device. The method also includes, in response to receipt of the work request: identifying, by a processor, the first item. The method further includes determining, by the processor, a target location corresponding to the first item, and selecting, by the processor, an unmanned aerial vehicle (UAV) from a plurality of encoder UAVs available for deployment in the item-storage environment, where each encoder UAV includes an encoder device configured to encode data to the identifier devices associated with the plurality of items. Yet further, the method includes causing the selected UAV to: (a) travel to the target location, and (b) while hovering at or near to the target location, encode particular identification data to the identifier device associated with the first item, where the particular identification data comprises at least the work request parameters.

In another example, a non-transitory computer readable medium having stored therein instructions, that when executed by a computing system, cause the computing system to perform functions is disclosed. The functions include receiving a work request indicative of at least one of: a first item or one or more work request parameters, where the first item is one of a plurality of items stored in an item-storage environment, and where each item is associated with a co-located identifier device. The functions also include in response to receipt of the work request: identifying, by a processor, the first item. The functions further include determining, by the processor, a target location corresponding to the first item, and selecting, by the processor, an unmanned aerial vehicle (UAV) from a plurality of UAVs available for deployment in the item-storage environment, where each UAV includes an encoder device configured to encode data to the identifier devices associated with the plurality of items. Yet further, the functions include causing the selected UAV to: (a) travel to the target location, and (b) while hovering at or near to the target location, encode particular identification data to the identifier device associated with the item, where the particular identification data comprises at least the work request parameters.

In a further example, a system is provided that includes a plurality of UAVs located in an item-storage environment, where a plurality of items are stored in the item-storage environment, where each item is associated with a co-located identifier device, where each UAV includes an encoder device configured to encode data to the identifier devices associated with the plurality of items, and where each UAV is operable to: (a) travel to a target location corresponding to a first item of the plurality of items, and (b) while hovering at or near to the target location, encode particular identification data to the identifier device associated with the first item; a plurality of robotic devices operable to: (a) travel to or near to a precise location of the first item, (b) read data from the identifier device associated with the first item (c) at or near to the precise location, retrieve the first item. The system also includes a controller configured to: receive a work request indicative of at least one of: the first item or one or more work request parameters; and in response to receipt of the work request: identify the first item. The controller is also configured to determine the target location corresponding to the first item, and to select an unmanned aerial vehicle (UAV) from the plurality of UAVs available for deployment in the item-storage environment. The controller is further configured to cause the selected UAV to: (a) travel to the target location, and (b) while hovering at or near to the target location, encode the particular identification data to the identifier device associated with the first item, where the particular identification data comprises at least the work request parameters.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
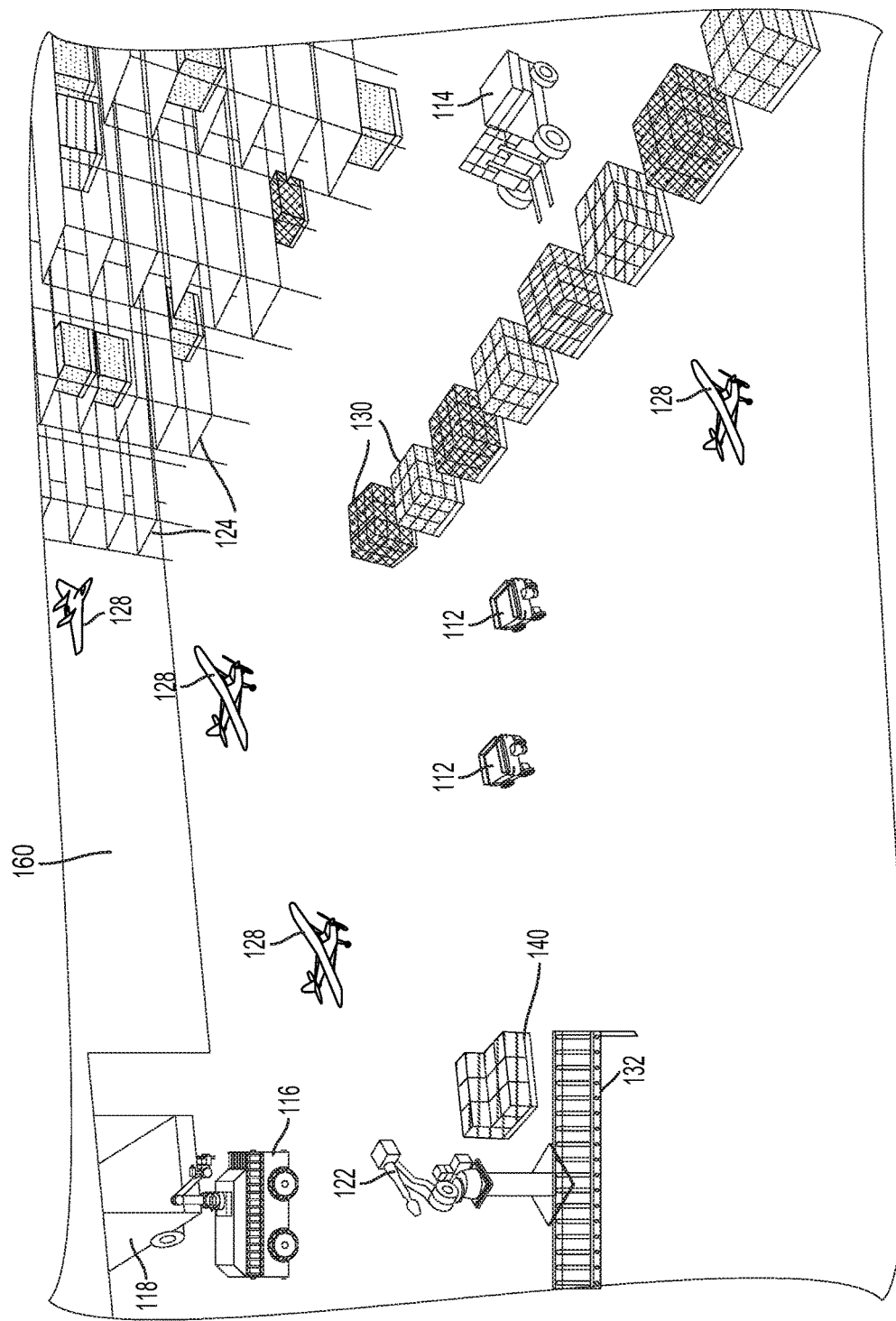
FIG. 1 shows a group of robotic devices, according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

It should be understood that the above embodiments, and other embodiments described herein, are provided for explanatory purposes, and are not intended to be limiting. Commercial entities, including manufacturers, wholesalers, e-commerce services, and transport businesses rely on storing consumable items in large fulfillment warehouses. Workers in the warehouse may be responsible for tasks including selecting, sorting, and packaging items for delivery to customers. Consumable items may be arranged in warehouses in an effort to improve efficiency of order processing and fulfillment. In order to improve efficiency, the placement of objects in a warehouse may be carefully designed, taking into account multiple factors, such as customer demand for various products, product size, product weight, etc. Further, warehouses may have elevated ceilings, such that consumables may be arranged on racks that extend dozens of feet off the ground.

In such warehouses, there is a need to handle the arrangement and processing of the consumable items stored in a warehouse. This may include the selection and outbound preparation of items for an order. This may also include bundling together several items (of a single order) in a single package for shipment. In order to meet the need of handling consumable items, warehouses may use machines or vehicles, such as cranes and forklifts, for lifting and moving goods or pallets of items. In some cases, one or more of the machines or vehicles may be a robotic device guided by a computer control system. Accordingly, autonomous robots may engage in a sophisticated set of warehouse arrangement and fulfillment functions.

In some warehouses, in order to expedite the process of finding and selecting an item in the warehouse, items are arranged on racks that can be moved using robotic devices. The computer control system may keep a database of the specific rack that each item in the warehouse is stored in. Thus, when the computer control system receives an order request, it may direct the robotic devices to move the racks that contain the ordered items to a station where the ordered items may be selected from the racks.

However, this process is limited in its efficiency, as the robotic devices have a load limit, thereby limiting the number of items that can be stored on a rack. As a result, the racks may be limited to a certain size, which may leave much of the vertical space in a warehouse unused. Thus, the storage capacity of the warehouse may not be optimized. Further, this process may be less efficient due to the need to select and bundle together several items in a single bin for shipment. Efficiency may also deteriorate as order size increases, since the number of the racks that may be moved to the collection station increases as the number of items in an order increases.

Example embodiments may provide for a method and systems for selective encoding of items in a warehouse using unmanned aerial vehicles (UAVs). For example, an identifier device, such as a Radio-Frequency Identification (RFID) tag, may be attached to each item in a warehouse. More generally, the identifier device may be any device that can identify the item that it is co-located with by, e.g., including stored information that identifies the item, such as a Unique Identification Number (UID). Further, the identifier device may be a "read-write" device such that more data may be stored on the device or such that the existing data on the identifier device may be modified.

As explained above, the items in a warehouse may be arranged on racks that extend dozens of feet off the ground. A computer control system in the warehouse may know the location of each rack. In an embodiment, the computer control system may receive an order fulfillment request that may identify one or more items that may be stored in the warehouse. The request may also include information indicative of the order such as an order number, a customer ID, a time of order, and an order fulfillment deadline. The computer control system may search for the items in a database that includes an inventory of the items stored in the warehouse. The database may also include information about the items, such as the UID of each item and the specific rack that each item is stored in.

Successively, the computer control system may send the order request and the information indicative of the ordered items (i.e., the specific rack that each ordered item is stored in and the UIDs of the ordered item) to one or more robotic devices. For instance, the robotic device may be UAV. The UAV may be configured to fly to a rack identified by the computer control system. At the rack, the UAV may identify an ordered item. For instance, the UAV may be equipped with a device (also referred herein to as an "encoder") that is configured to read from and/or write to ("encode") the identifier device attached to the ordered item. Accordingly, the UAV may use the read/write device to read data from the identifier devices attached to the items in order to identify the ordered item from the myriad of items that may be stored on a rack. The UAV may compare the UIDs that it reads from the items' identifier devices to the UID(s) of the ordered item(s). Additionally and/or alternatively, the UAV may be equipped with sensors that may be used to identify the ordered item. Once the UAV identifies the item, the UAV may write the order information to the identifier device attached to the ordered item. As explained below, writing the order information to the ordered item's identifier device may increase the processing efficiency of the order.

The UAV may also be configured to determine the precise location of the ordered item. For example, the UAV may use sensors to determine the item's precise longitude, latitude, and altitude. In another example, the UAV may determine the precise location of the ordered item by determining the precise location of the item in the rack (e.g., the location of the rack may be known to the computer control system). The UAV may communicate the precise location of the ordered item in the rack to the computer control system.

The computer control system, upon receiving the precise location of the item, may communicate the location to the robotic devices deployed in the warehouse that are configured to retrieve ordered items from racks. To increase efficiency, the collector robotic device may receive the location of several items that the robotic device is responsible to retrieve. The collector robotic device may retrieve the items and transport the items to a station for further processing. As the items may be from different orders, a robotic device configured to sort the items may be located at the collection station. The sorter robotic device may identify each item and the order that each item is part of by reading data from the identifier device attached to each item. The sorter robotic device may then sort the items into groups based on the order that an item is part of. The groups of items may be transported for further processing and shipping. At each step of the processing procedure, the items may be rapidly identified using the identifier devices attached to them.

Accordingly, by selectively encoding identifier devices associated with ordered items, the efficiency in the warehouse may be improved. For example, the selective encoding of identifier devices attached to ordered items may make it more efficient to identify and select items. Accordingly, the size limitation on the racks is eliminated, which increases the storage efficiency in the warehouse.

Various embodiments of the process described above may be possible. For example, a plurality of UAVs may be deployed in a warehouse. Further, each UAV may be assigned to fly over a specific area of the warehouse. Accordingly, the computer control system may selectively assign a UAV to assist in the fulfillment of a specific order. Additionally and/or alternatively, more than one UAV may be assigned to a single order. Further, the computer control system may be responsible for assigning each UAV to a specific area. Therefore, the computer control system may assign more UAVs to an area where a rack that contains popular items is located than the number of UAVs assigned to an area where a rack that contains less popular items is located. In this arrangement, a UAV may be able to rapidly identify and locate items. In other embodiments, the computer control system may also assign each UAV to fly at a specific altitude such that more than one UAV may be located at the same coordinates, albeit at different altitudes.

In other examples, the computer control system may instruct a UAV to locate and write data to the identifier device of an item for functions other than order fulfillment, such as item management and item rearrangement. In yet other examples, the identifier device associated with an item may be located on the rack that the item is stored in. For instance, the identifier device may be attached to a shelf on which an item is stored, such that the device may identify the items that are located on the shelf and the precise location of the shelf. In such an example, the device may be a Bluetooth Low Energy (BLE) beacon. Accordingly, a UAV may fly to the location of the rack, identify the shelf on which the targeted item is located, and encode data to the identifier device (i.e. BLE beacon) associated with the item. Upon receiving the data, the BLE beacon may be configured to transmit packets, which contain information indicative of the item, the order, and the location of the shelf, that enable the collecting robotic device to locate the targeted item.

In another implementation, an electronic shelf label (ESL) may be attached to the racks. An ESL may include a display. A UAV may fly to the location of the rack and encode information to the ESL device. The information may be the information that is displayed by the ESL. In yet another implementation, the racks onto which items are stored may be smart racks. Smart racks may be configured to encode data to the identifier devices that are attached to the smart rack. Smart racks may be deployed in areas where UAVs may not be able to operate.

II. Illustrative Item-Storage Environment

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a group of robotic devices deployed within an item-storage environment, such as a warehouse environment. More specifically, a combination of fixed and mobile robotic devices may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within an item-storage environment and/or for transport to and from the item-storage environment may provide a number of industrial and business advantages.

According to various embodiments, automating the process of loading and/or unloading delivery trucks at the item-storage environment and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within an item-storage environment.

As used herein, the term "an item-storage environment" may refer to any physical environment in which boxes or items may be manipulated, processed, and/or stored by robotic devices. In some examples, an item-storage environment may be a single physical building or structure, which may additionally contain certain fixed components, such as pallet racks for storing pallets of objects. In other examples, some fixed components may be installed or otherwise positioned within the environment before or during object processing. In additional examples, an item-storage environment may include multiple separate physical structures, and/or may also include physical spaces that are not covered by a physical structure as well.

Further, the terms "boxes" and "items" may refer to any object or item that can be placed onto a pallet or loaded onto or unloaded from a truck or container. For example, in addition to rectangular solids, "boxes" or "items" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robotic devices within a warehouse. Examples herein may also be applied toward objects other than boxes as well, and toward objects of various sizes and shapes.

Additionally, the items or boxes may be a standardized container or parcel that includes one or more features configured to interface with robotic devices, as described herein. For instance, the item may include one or more loops, indentations, tabs, anchor points, or other structural features arranged to be engaged by corresponding components of a "robotic collector". In some cases, the standardized features of the item may be integrated in a packaging module (e.g., a reusable or disposable container), and the packaging module may house (or be fastened to) one or more items that are being delivered or retrieved using the robotic collector. Such items may include food, medical equipment or supplies, retail goods, relief items, or any other items that may be found in an item-storage environment.

Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse group of robotic devices may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Figure 2:
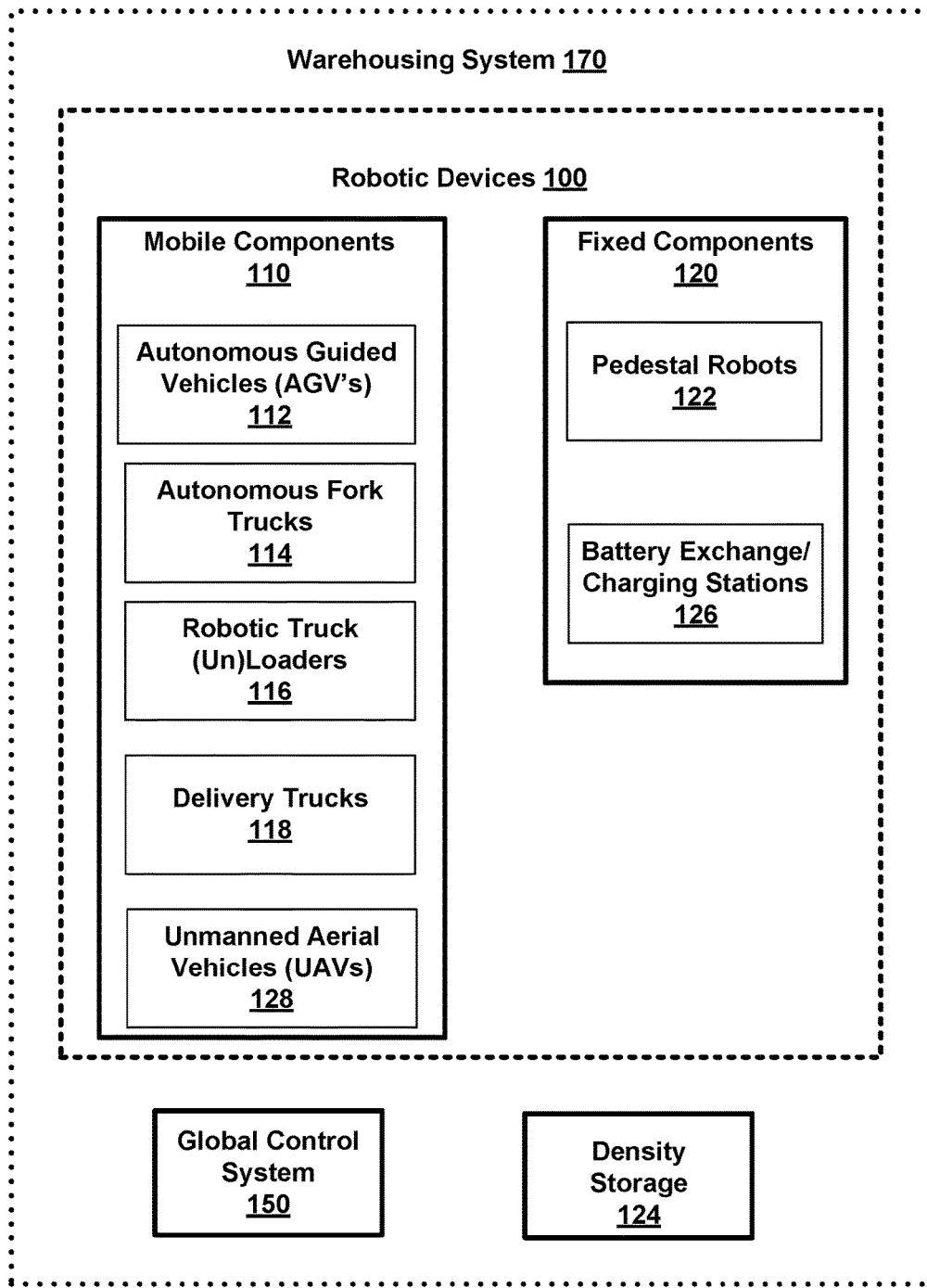
FIG. 2 is a functional block diagram illustrating components of a group of robotic devices, according to an example embodiment.

Referring now to the figures, FIG. 1 depicts a group of robotic devices within a warehouse setting 160, according to an example embodiment. More specifically, different types of robotic devices may form a heterogeneous group of robotic devices 100 that may be controlled to collaborate to perform tasks related to the processing of items, objects, or boxes within a warehouse environment 160. As illustrated in FIG. 2, the group of robotic devices 100 may be part of a warehousing system 170. Certain example types and numbers of different robotic devices are shown here for illustration purposes, but the group of robotic devices 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

In FIG. 1, a three-dimensional coordinate system within the warehouse 160 may be established. For example, the three-dimensional coordinate system may be a Cartesian coordinate system with an x-axis, a y-axis, and a z-axis. As a result, each of the fixed components may be associated with a known (x, y, z) coordinate within the coordinate system, where the x-, y-, and z-coordinates correspond to a distance from a specified origin point in the warehouse 160.

One example type of robotic device shown within the group of robotic devices 100 is an autonomous guided vehicle (AGV) 112, which may be a relatively small, mobile device with wheels that may function to transport individual packages, cases, or totes from one location to another within the warehouse 160. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse 160. In some examples, movements of delivery truck 118 (e.g., to deliver packages to another warehouse) may also be coordinated with robotic devices within the group of robotic devices.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the group of robotic devices 100 may also include various fixed components that may be positioned within the warehouse 160. In some examples, one or more fixed robotic devices may be used to move or otherwise process boxes. For instance, a pedestal robot 122 may include a robotic arm elevated on a pedestal that is fixed to the ground floor within the warehouse 160. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse 160. The pedestal robot 122 may also pick up and move boxes from nearby pallets 140 and place the boxes on conveyor belt 120 to send the boxes to a different area of the warehouse 160 for further processing.

In additional examples, the group of robotic devices 100 may employ additional fixed components positioned within a warehouse space 160. For instance, high density storage racks 124 may be used to store pallets and/or objects within the warehouse 160. The storage racks 124 may be designed and positioned to facilitate interaction with one or more robotic devices within the group of robotic devices, such as autonomous fork truck 114. In further examples, certain ground space may be selected and used for storage of pallets or boxes as well or instead. For instance, pallets 130 may be positioned within the warehouse environment 160 at chosen locations for certain periods of time to allow the pallets to be picked up, distributed, or otherwise processed by one or more of the robotic devices.

FIG. 2 is a functional block diagram illustrating components of a warehousing system 170, according to an example embodiment. As illustrated in FIG. 2, the warehousing system 170 may include the group of robotic devices 100. The group of robotic devices 100 could include one or more of various mobile components, such as AGV's 112, autonomous fork trucks 114, robotic truck loaders/unloaders 116, delivery trucks 118, and unmanned aerial vehicles (UAVs) 128. The group of robotic devices 100 may additionally include one or more fixed components positioned within a warehouse or other environment, such as pedestal robots 122, and battery exchange/charging stations 126. Further, the warehousing system 170 may include a global control system 150 and density storage containers 124. In further examples, different numbers and types of the components illustrated within FIG. 2 may be included within a system and the group of robotic devices, certain types may be omitted, and additional functional and/or physical components may be added to the examples illustrated by FIGS. 1 and 2 as well. To coordinate actions of separate components, the global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the group of robotic devices 100. In some examples, one or more mobile robots may be brought in to map a space before determining placement of certain fixed components 120, such as the pedestal robots 122 or battery exchange stations 126. Once map information is available, the system 170 may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within the group of robotic devices 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within warehousing system 170. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within warehousing system 170. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the group of robotic devices and/or from external sources. Strategies may then be refined over time to enable the group of robotic devices to use less space, less time, less power, less electricity, or to optimize across other variables. In some examples, optimizations may span across multiple warehouses, possibly including other warehouses with group of robotic devices and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing the group of robotic devices 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels or devices on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within the group of robotic devices 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the group of robotic devices when needed or convenient.

In some examples, a group of robotic devices 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the group of robotic devices 100 when necessary.

III. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 3A:
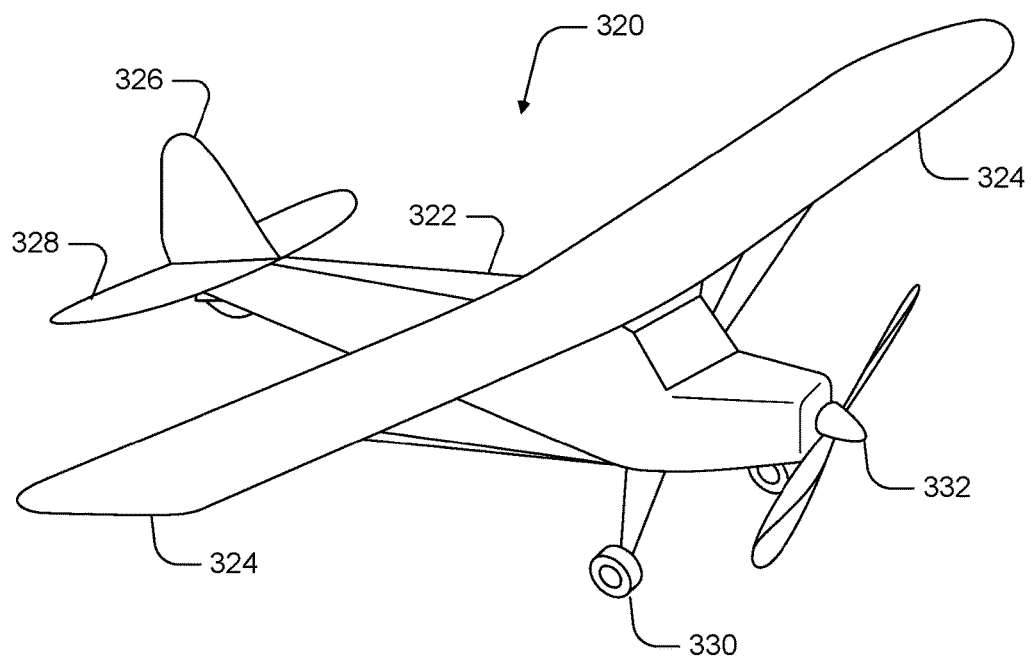
FIGS. 3A, 3B, 4, and 5 are simplified illustrations of unmanned aerial vehicles, according to example embodiments.

FIG. 3A shows an example of a fixed-wing UAV 320. The fixed-wing UAV 320 includes a fuselage 322, two wings 324 with an airfoil-shaped cross section to provide lift for the UAV 320, a vertical stabilizer 326 (or fin) to stabilize the plane's yaw (turn left or right), a horizontal stabilizer 328 (also referred to as an elevator or tailplane) to stabilize pitch (tilt up or down), landing gear 330, and a propulsion unit 332, which can include a motor, shaft, and propeller.

Figure 3B:
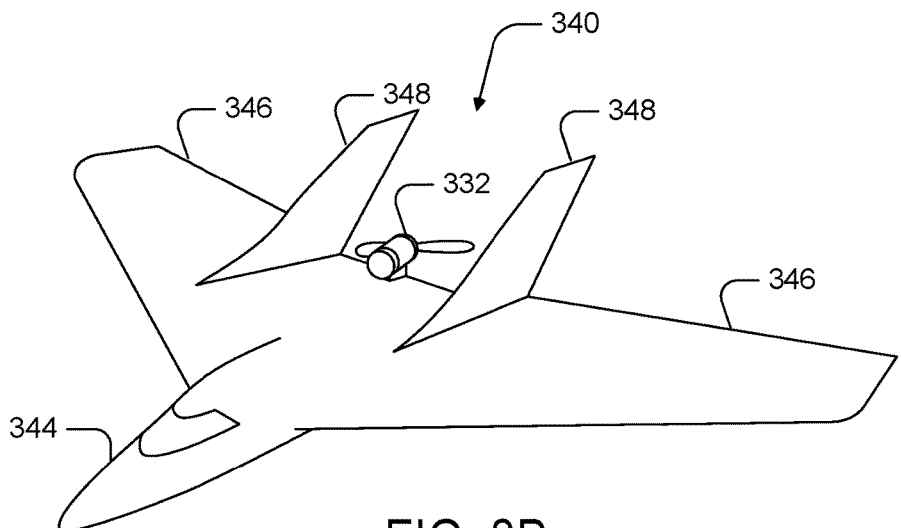

FIG. 3B shows an example of a UAV 340 with a propeller in a pusher configuration. The term "pusher" refers to the fact that a propulsion unit 342 is mounted at the back of the UAV and "pushes" the vehicle forward, in contrast to the propulsion unit being mounted at the front of the UAV. Similar to the description provided for FIGS. 3A and 3B, FIG. 3C depicts common structures used in a pusher plane, including a fuselage 344, two wings 346, vertical stabilizers 348, and the propulsion unit 342, which can include a motor, shaft, and propeller.

Figure 4:
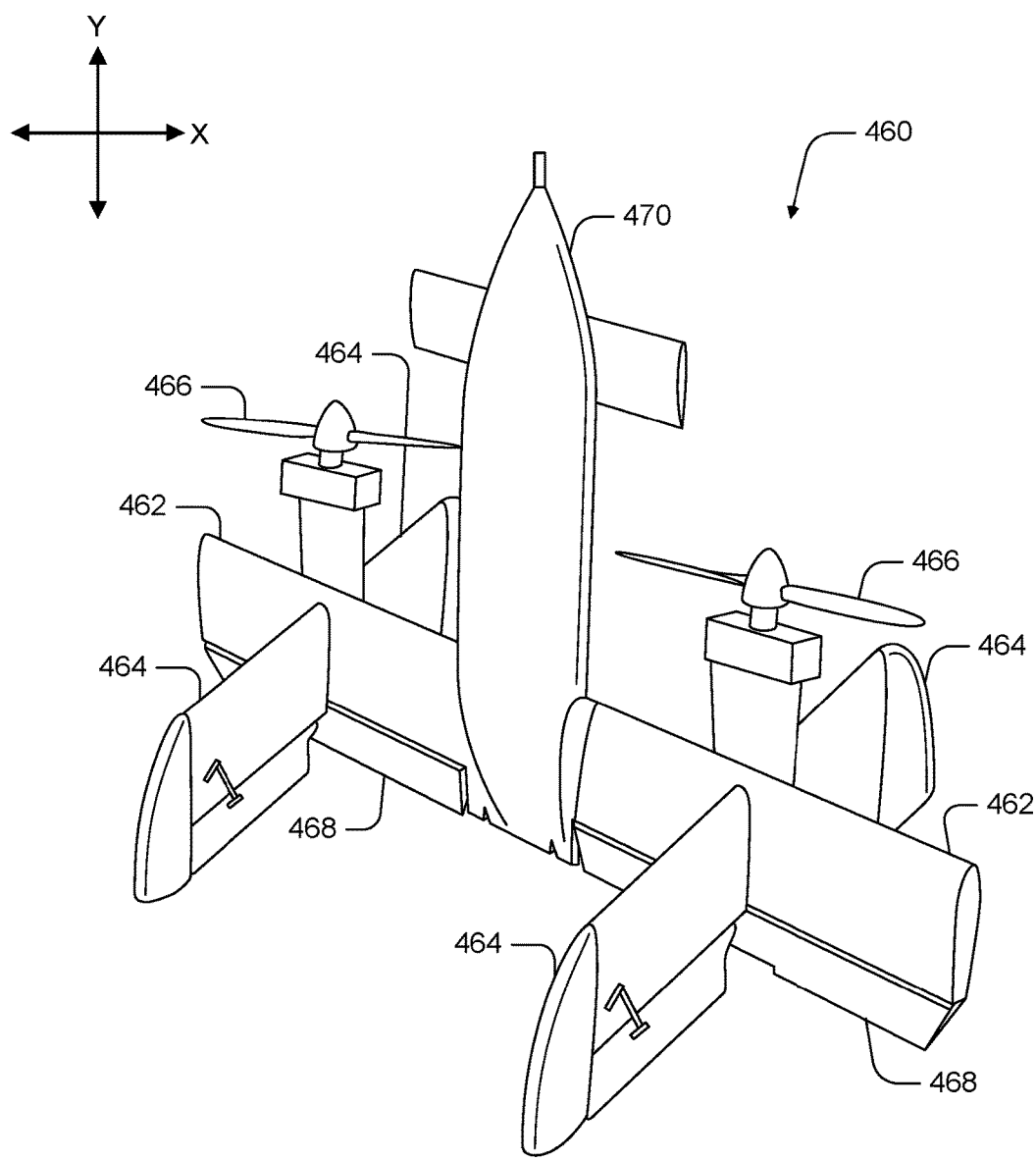

FIG. 4 shows an example of a tail-sitter UAV 460. In the illustrated example, the tail-sitter UAV 460 has fixed wings 462 to provide lift and allow the UAV 460 to glide horizontally (e.g., along the x-axis, in a position that is approximately perpendicular to the position shown in FIG. 3). However, the fixed wings 462 also allow the tail-sitter UAV 460 to take off and land vertically on its own.

For example, at a launch site, the tail-sitter UAV 460 may be positioned vertically (as shown) with its fins 464 and/or wings 462 resting on the ground and stabilizing the UAV 460 in the vertical position. The tail-sitter UAV 460 may then take off by operating its propellers 466 to generate an upward thrust (e.g., a thrust that is generally along the y-axis). Once at a suitable altitude, the tail-sitter UAV 460 may use its flaps 468 to reorient itself in a horizontal position, such that its fuselage 470 is closer to being aligned with the x-axis than the y-axis. Positioned horizontally, the propellers 466 may provide forward thrust so that the tail-sitter UAV 460 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 5:
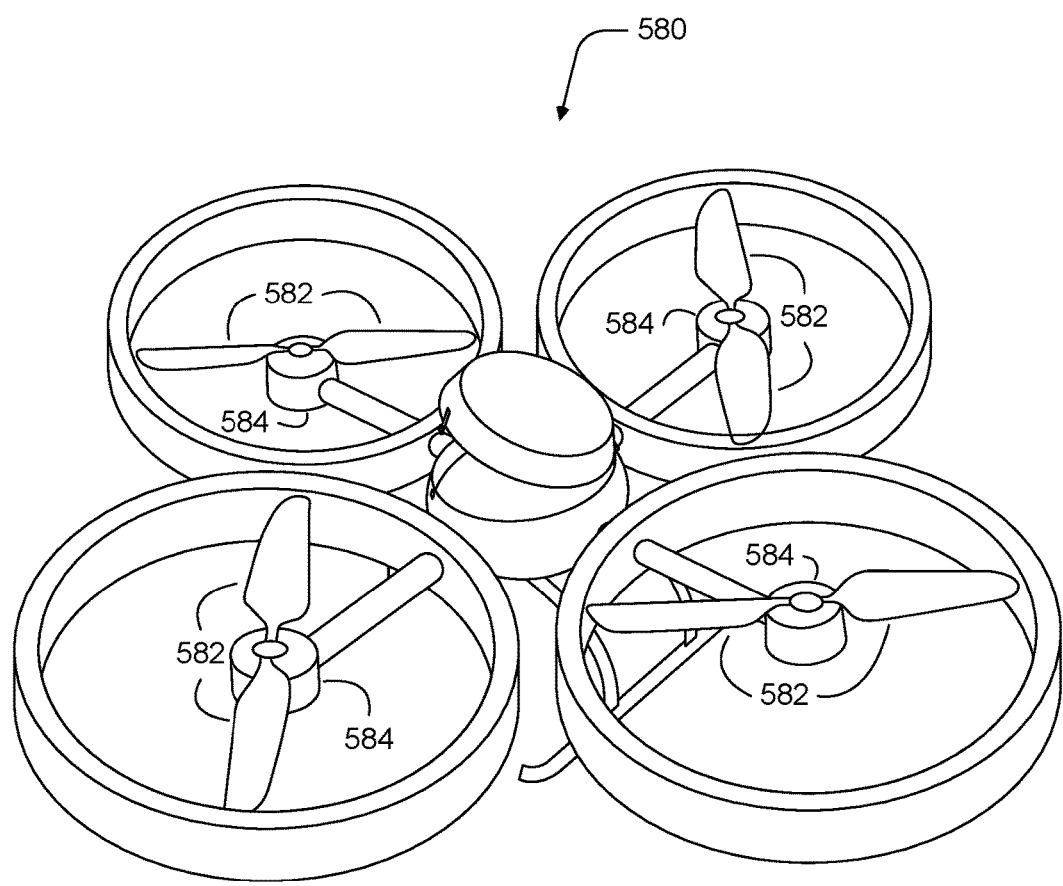

As noted above, some embodiments may involve other types of UAVs, in addition to or in the alternative to fixed-wing UAVs. For instance, FIG. 5 shows an example of a rotorcraft that is commonly referred to as a multicopter 580. The multicopter 580 may also be referred to as a quadcopter, as it includes four rotors 582. It should be understood that example embodiments may involve a rotorcraft with more or fewer rotors than the multicopter 580. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 580 in greater detail, the four rotors 582 provide propulsion and maneuverability for the multicopter 580. More specifically, each rotor 582 includes blades that are attached to a motor 584. Configured as such, the rotors 582 may allow the multicopter 580 to take off and land vertically, to maneuver in any direction, and/or to hover. Further, the pitch of the blades may be adjusted as a group and/or differentially, and may allow the multicopter 580 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV.

Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

IV. Illustrative Computing Devices

Figure 6:
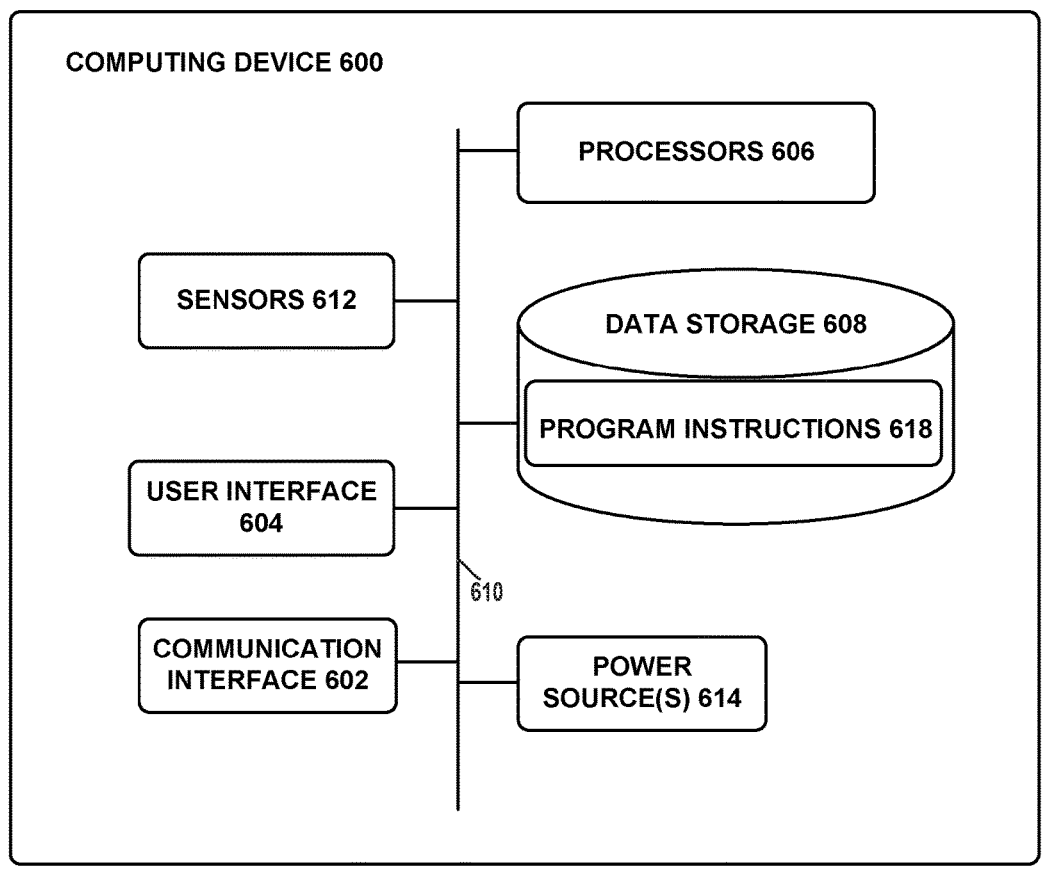
FIG. 6 is a simplified block diagram illustrating components of a computing device, according to an example embodiment.

As explained above, the global control system 150 may be implemented on a computing device, such as a server or cloud-based server. For purposes of example, FIG. 6 is a simplified block diagram showing some of the components of a computing device 600 that may be utilized in example embodiments. It should be understood that not all of the illustrated components shown in FIG. 6 are required. Further, a computing device may include components that are not shown in FIG. 6.

As shown in FIG. 6, computing device 600 may include a communication interface 602, input method editor (IME) 604, a processor 606, data storage 608, sensors 612, and power source 614 all of which may be communicatively linked together by a system bus, network, or other connection mechanism 610.

Communication interface 602 may function to allow computing device 600 to communicate, using analog or digital modulation, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface). Accordingly, the global control system 150 could communicate with some or all of the actors or devices through wired connections or other types of communication channels as well or instead, including the described network protocols.

User interface 604 may function to allow computing device 600 to interact with a human or non-human user, such as to receive input from a user and to provide output to the user. Thus, user interface 604 may include input components such as a keypad, keyboard, touch-sensitive or presence-sensitive panel, computer mouse, trackball, joystick, microphone, and so on. User interface 604 may also include one or more output components such as a display screen which, for example, may be combined with a presence-sensitive panel. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

Processor 606 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or functions disclosed in this specification and/or the accompanying drawings. The execution of program instructions 618 by processor 606 may result in processor 606 using data stored in data storage 608.

The computing device 600 may be coupled with one or more sensors 612 such as optical flow sensors, force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chip, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

V. Illustrative Components of a Robotic Device

Figure 7:
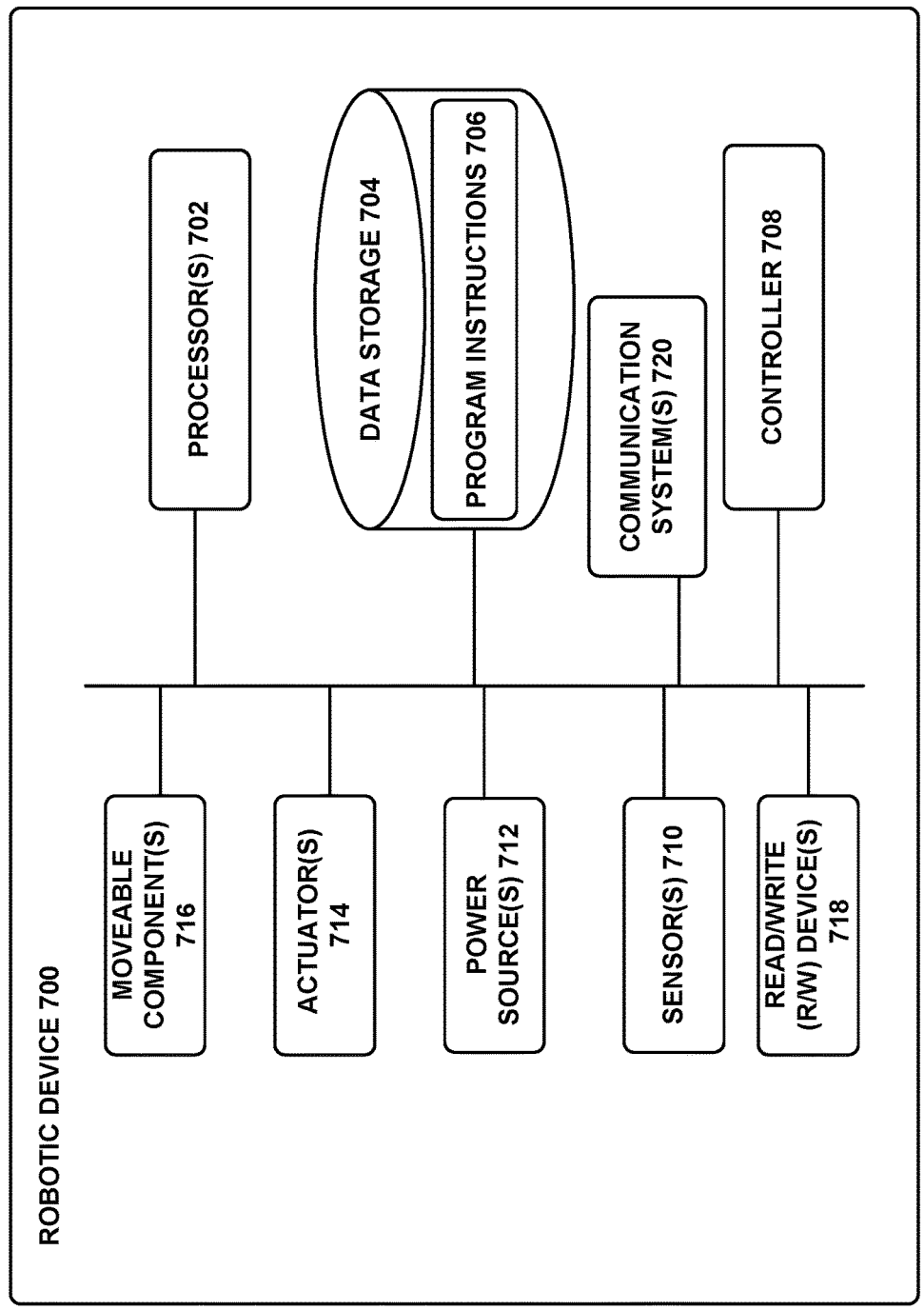
FIG. 7 is a simplified block diagram illustrating components of a robotic device, according to an example embodiment.

FIG. 7 is a simplified block diagram illustrating components of a robotic device 700, according to an example embodiment. Robotic device 700 may take the form of or be similar in form to one of the robotic devices 112, 114, 116, 118, 128, 1010 shown in FIGS. 1, 2, and 12. However, a robotic device 700 may also take other forms.

Generally, a robotic device 700 may be any device that has a computing ability and interacts with its surroundings with an actuation capability and/or with ability to emit/generate physical phenomena such as light and/or sound, among others. For instance, the robotic device 700 may be a humanoid robot, a robotic arm, or a quadruped robot, among others. Additionally, the robotic device 700 may also be referred to as a robotic device, a robotic manipulator, a robot client, or a robot, among others.

The robotic device 700 is shown to include processor(s) 702, data storage 704, program instructions 706, controller 708, sensor(s) 710, power source(s) 712, actuator(s) 714, movable component(s) 716, read/write device(s) 718, and communication system(s) 720. Note that the robotic device 700 is shown for illustration purposes only and robotic device 700 may include additional components and/or have one or more components removed without departing from the scope of the disclosure. Further, note that the various components of robotic device 700 may be arranged and connected in any manner.

As noted, the robotic device 700 may include a controller 708 (e.g., taking the form of a microcontroller). The controller 708 may include processing unit and data storage, and may be arranged to manage or carry out various operations (e.g., individually or in collaboration with processor(s) 702). The controller may take various forms. For instance, a controller may take the form of a chip set, a server system, a digital signal processor, a programmable logic controller, and/or a sampled-data system, among other possibilities. Moreover, a controller could also be referred to herein as a control system, among other.

Additionally, the robotic device 700 may also include one or more actuator(s) 714. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 714 may cause movement of various movable component(s) 716 of the robotic device 700. The moveable component(s) 716 may include appendages/members such as robotic arms, legs, and/or hands, among others. The moveable component(s) 716 may also include a movable base, wheels, and/or end effectors, among others. Further, when a robotic device 700 includes at least one end effector, such an end effector may be a tool (e.g., a screwdriver, drill, welding iron, or some combination thereof) and/or a gripper, among others as discussed above.

Additionally, robotic device 700 may include one or more read/write (R/W) devices 718 (also referred to herein as "encoder"). The one or more R/W devices 718 may include software, firmware, and/or hardware that may help to provide or assist in the reading data from and writing data to at least devices described herein.

Configured as such, a robotic device 700 may use the one or more R/W devices 718 to read data from and write data to a variety of devices that may be associated with an item. Within examples, a robotic device may include more than one R/W device, where each R/W devices 718 may be a different type of device. Within examples, the one or more R/W devices 718 that the robotic device 700 is equipped with may depend on the type of devices that are associated with the items stored in an item-storage environment. As explained above, the device attached to an item may be any device that can identify the item that it is co-located with by, e.g., including stored information that identifies the item, such as a Unique Identification Number (UID).

Further, the device may be a "read-write" device such that more data may be stored on the device or such that the existing data on the device may be modified. For example, the device may be a Radio-frequency Identification (RFID) tag. In another example, the device may be a Near Field Communication (NFC) tag. In yet examples, the device may be a Bluetooth Low Energy (BLE) device or an electronic shelf label (ESL) device. Accordingly, the robotic device 700 may be equipped with at least one device that is capable of reading data from and writing to the devices that may be found in the item-storage environment. Thus, a robotic device 700 may be equipped with at least one of an RFID encoder, an NFC encoder, a BLE encoder, and/or ELS encoder. In other examples, different robotic devices 700 deployed in an item-storage environment may be equipped with different read/write devices 718.

In a further aspect, robotic device 700 includes one or more communication systems 720. The communications systems 720 may include one or more wireless interfaces and/or one or more wireline interfaces, which allow robotic device 700 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a robotic device 700 may include communication systems 720 that allow for both short-range communication and long-range communication. For example, the robotic device 700 may be configured for short-range communications using Bluetooth and for long-range communications under a CDMA protocol.

VI. Illustrative Components of a UAV

Figure 8:
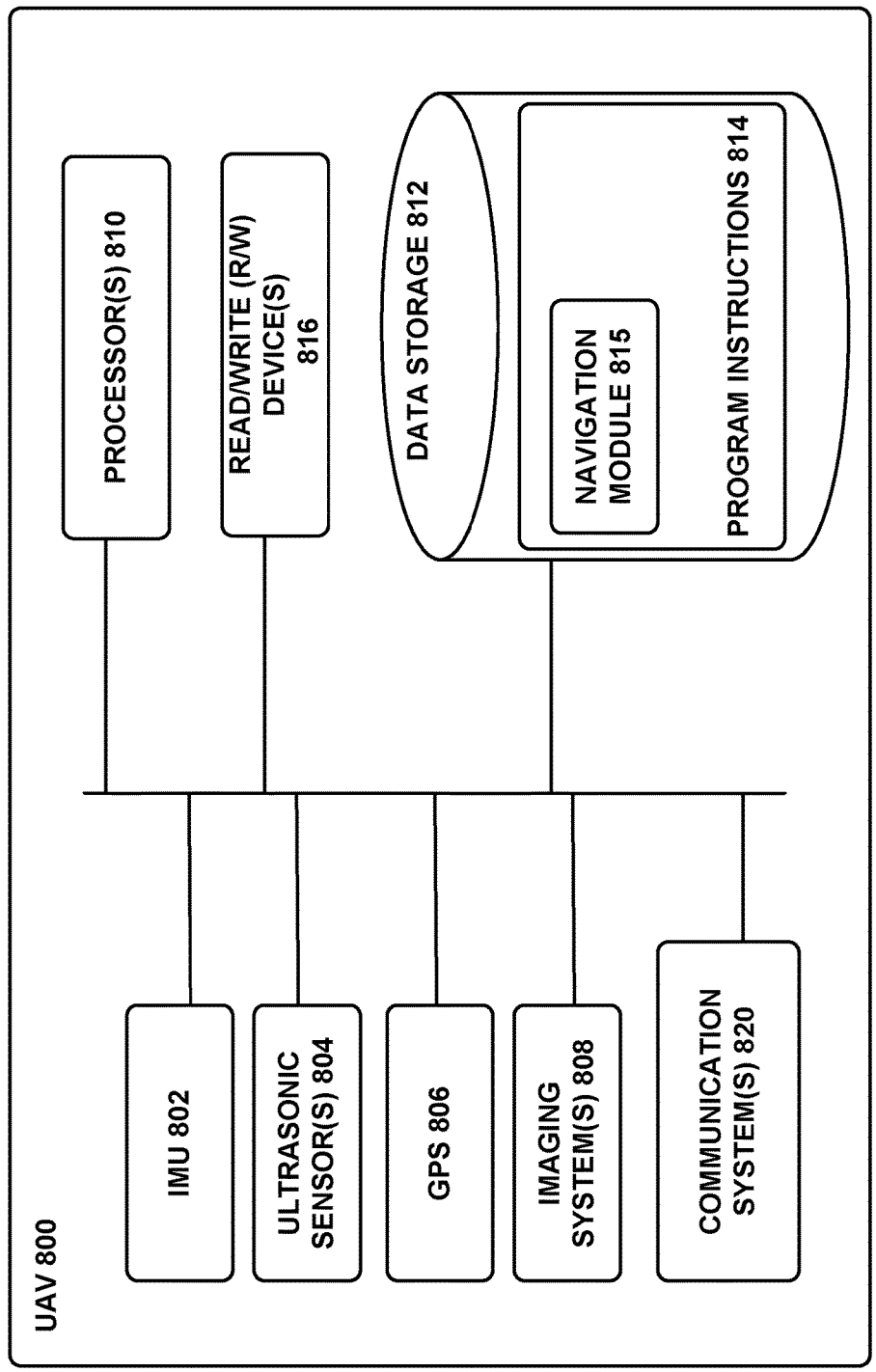
FIG. 8 is a simplified block diagram illustrating components of an unmanned aerial vehicle, according to an example embodiment.

FIG. 8 is a simplified block diagram illustrating components of a UAV 800, according to an example embodiment. UAV 800 may take the form of or be similar in form to one of the UAVs 300, 400, 500, and 550 shown in FIGS. 3A, 3B, 4, and 5. However, a UAV 800 may also take other forms.

UAV 800 may include various types of sensors, and may include a computing system configured to provide the functionality described herein. In the illustrated embodiment, the sensors of UAV 800 include an inertial measurement unit (IMU) 802, ultrasonic sensor(s) 804, GPS 806, imaging system(s) 808, read/write device(s) 816, among other possible sensors and sensing systems.

In the illustrated embodiment, UAV 800 also includes one or more processors 810. A processor 810 may be a general-purpose processor or a special purpose processor (e.g., digital signal processors, application specific integrated circuits, etc.). The one or more processors 810 can be configured to execute computer-readable program instructions 814 that are stored in the data storage 812 and are executable to provide the functionality of a UAV described herein.

The data storage 812 may include or take the form of one or more computer-readable storage media that can be read or accessed by at least one processor 810. The one or more computer-readable storage media can include volatile and/or non-volatile storage components, such as optical, magnetic, organic or other memory or disc storage, which can be integrated in whole or in part with at least one of the one or more processors 810. In some embodiments, the data storage 812 can be implemented using a single physical device (e.g., one optical, magnetic, organic or other memory or disc storage unit), while in other embodiments, the data storage 812 can be implemented using two or more physical devices.

As noted, the data storage 812 can include computer-readable program instructions 814 and perhaps additional data, such as diagnostic data of the UAV 800. As such, the data storage 814 may include program instructions to perform or facilitate some or all of the UAV functionality described herein. For instance, in the illustrated embodiment, program instructions 814 include a navigation module 815.

A. Sensors

In an illustrative embodiment, IMU 802 may include both an accelerometer and a gyroscope, which may be used together to determine the orientation of the UAV 800. In particular, the accelerometer can measure the orientation of the vehicle with respect to earth, while the gyroscope measures the rate of rotation around an axis. IMUs are commercially available in low-cost, low-power packages. For instance, an IMU 802 may take the form of or include a miniaturized MicroElectroMechanical System (MEMS) or a NanoElectroMechanical System (NEMS). Other types of IMUs may also be utilized.

An IMU 802 may include other sensors, in addition to accelerometers and gyroscopes, which may help to better determine position and/or help to increase autonomy of the UAV 800. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 800, slight errors in measurement may compound over time and result in a more significant error. However, an example UAV 800 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 800 may also include a pressure sensor or barometer, which can be used to determine the altitude of the UAV 800. Alternatively, other sensors, such as sonic altimeters or radar altimeters, can be used to provide an indication of altitude, which may help to improve the accuracy of and/or prevent drift of an IMU.

In a further aspect, UAV 800 may include one or more sensors that allow the UAV to sense objects in the environment. For instance, in the illustrated embodiment, UAV 800 includes ultrasonic sensor(s) 804. Ultrasonic sensor(s) 804 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA- DAR) system, and/or an infrared or forward-looking infrared (FLIR) system, among other possibilities.

UAV 800 also includes a GPS receiver 806. The GPS receiver 806 may be configured to provide data that is typical of well-known GPS systems, such as the GPS coordinates of the UAV 800. Such GPS data may be utilized by the UAV 800 for various functions. As explained elsewhere herein, the global control system 150 may provide may provide the UAV with the GPS coordinates of a rack. As such, the UAV may use its GPS receiver 806 to help navigate to the rack's location, as indicated, at least in part, by the GPS coordinates provided by the global control system 150. Other examples are also possible.

UAV 800 may also include one or more imaging system(s) 808. For example, one or more still and/or video cameras may be utilized by a UAV 800 to capture image data from the UAV's environment. As a specific example, charge-coupled device (CCD) cameras or complementary metal-oxide-semiconductor (CMOS) cameras can be used with unmanned vehicles. Such imaging sensor(s) 808 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 800 may use its one or more imaging system 808 to help in determining its location. For example, UAV 800 may capture imagery of its environment and compare it to what it expects to see in its environment given current estimated position (e.g., its current GPS coordinates), and refine its estimate of its position based on this comparison.

In a further aspect, UAV 800 may use its one or more imaging system 808 to help in object identification. For example, UAV 800 may capture imagery of its environment and compare it to what it expects to see in its environment given current estimated position (e.g., its current GPS coordinates). Based on the comparison, the UAV 800 may identify one or more objects. In an example, the UAV may capture imagery of the environment at GPS coordinates (i.e. received from the global control system 150) where a rack may be located. Accordingly, the UAV 800 may identify the rack. The UAV 800 may also use the comparison to determine features of the rack.

In a further aspect, UAV 800 may include one or more microphones. Such microphones may be configured to capture sound from the UAVs environment.

B. Navigation and Location Determination

The navigation module 815 may provide functionality that allows the UAV 800 to, e.g., move about in its environment and reach a desired location. To do so, the navigation module 815 may control the altitude and/or direction of flight by controlling the mechanical features of the UAV that affect flight (e.g., rotors 310 of UAV 300).

In order to navigate the UAV 800 to a target location, a navigation module 815 may implement various navigation techniques, such as map-based navigation and localization-based navigation, for instance. With map-based navigation, the UAV 800 may be provided with a map of its environment (i.e. from the global control system 150), which may then be used to navigate to a particular location on the map. With localization-based navigation, the UAV 800 may be capable of navigating in an unknown environment using localization. Localization-based navigation may involve a UAV 800 building its own map of its environment and calculating its position within the map and/or the position of objects in the environment. For example, as a UAV 800 moves throughout its environment, the UAV 800 may continuously use localization to update its map of the environment. This continuous mapping process may be referred to as simultaneous localization and mapping (SLAM). Other navigation techniques may also be utilized.

In some embodiments, the navigation module 815 may navigate using a technique that relies on waypoints. In particular, waypoints are sets of coordinates that identify points in physical space. For instance, an air-navigation waypoint may be defined by a certain latitude, longitude, and altitude. Accordingly, navigation module 815 may cause UAV 800 to move from waypoint to waypoint, in order to ultimately travel to a final destination (e.g., a final waypoint in a sequence of waypoints).

In a further aspect, navigation module 815 and/or other components and systems of UAV 800 may be configured for "localization" to more precisely navigate to a rack. More specifically, it may be desirable in certain situations for a UAV to be close to a rack in order to read and/or write data to a device associated with an item stored in the rack. To this end, a UAV may use a two-tiered approach in which it uses a more-general location-determination technique to navigate to a target location or a rack location, and then use a more-refined location-determination technique to identify and/or navigate to the target location (i.e. the location of the device) within the general area.

For example, a UAV 800 may navigate to the general area of a rack using waypoints that are pre-determined based on GPS coordinates, which may be provided by the global controller 150. The UAV 800 may then switch to mode in which it utilizes a localization process to locate and travel to a specific location of an item and/or of a device associated with the item.

Various types of location-determination techniques may be used to accomplish localization of an item once a UAV 800 has navigated to an area near a rack. For instance, a UAV 800 may be equipped with one or more sensory systems, such as, for example, imaging system(s) 808, a directional microphone array (not shown), ultrasonic sensors 804, infrared sensors (not shown), and/or other sensors, which may provide input that the navigation module 815 utilizes to navigate autonomously or semi-autonomously to the specific location of an item.

As another example, once the UAV 800 reaches the general area of a rack, the UAV 800 may switch to a "fly-by-wire" mode where it is controlled, at least in part, by a remote operator, who can navigate the UAV 800 to specific location of an item and/or of an identifier device associated with the item. To this end, sensory data from the UAV 800 may be sent to the remote operator to assist them in navigating the UAV to the specific location. For example, the UAV 800 may stream a video feed or a sequence of still images from the UAV's imaging system(s) 808. Other examples are possible.

As an additional example, once a UAV 800 arrives near the rack, the UAV may utilize a beacon from a remote device (i.e. the identifier device co-located with an item) to determine the location of an item. Such a beacon may take various forms. As an example, consider the scenario where a remote device is able to send out directional signals (e.g., an RF signal, a light signal and/or an audio signal). In this scenario, the UAV 800 may be configured to navigate by "sourcing" such directional signals—in other words, by determining where the signal is strongest and navigating accordingly. As another example, a device can emit a frequency, either in the human range or outside the human range, and the UAV can listen for that frequency and navigate accordingly. Further, as described elsewhere herein, the UAV 800 may also confirm that it has reached the location of an item by reading identification data from an identifier device attached to the item.

In an alternative arrangement, a navigation module may be implemented at a remote computing device, which communicates wirelessly with the UAV. The remote computing device, such as the global control system 150, may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 310 of UAV 300) in order to effectuate such movements. The remote computing system may then communicate such adjustments to the UAV so it can move in the determined manner.

C. Communication Systems

In a further aspect, UAV 800 includes one or more communication systems 820. The communications systems 820 may include one or more wireless interfaces and/or one or more wireline interfaces, which allow UAV 800 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 800 may include communication systems 820 that allow for both short-range communication and long-range communication. For example, the UAV 800 may be configured for short-range communications using Bluetooth and for long-range communications under a CDMA protocol. In such an embodiment, the UAV 800 may be configured to function as a "hot spot;" or in other words, as a gateway or proxy between a remote support device and one or more data networks, such as cellular network and/or the Internet. Configured as such, the UAV 800 may facilitate data communications that the remote support device would otherwise be unable to perform by itself.

For example, UAV 800 may provide a WiFi connection to a remote device, and serve as a proxy or gateway to a cellular service provider's data network, which the UAV might connect to under an LTE or a 3G protocol, for instance. The UAV 800 could also serve as a proxy or gateway to a high-altitude balloon network, a satellite network, or a combination of these networks, among others, which a remote device might not be able to otherwise access.

D. Power Systems

In a further aspect, UAV 800 may include power system(s) 821. A power system 821 may include one or more batteries for providing power to the UAV 800. In one example, the one or more batteries may be rechargeable and each battery may be recharged via a wired connection between the battery and a power supply and/or via a wireless charging system, such as an inductive charging system that applies an external time-varying magnetic field to an internal battery.

E. Read/Write (R/W) Device

As noted above, UAV 800 may include one or more read/write (R/W) devices 816 (also referred herein to as "encoder(s)"). The one or more R/W devices 816 may include software, firmware, and/or hardware that may help to provide or assist in the reading data from and writing data to at least devices described herein.

Configured as such, a UAV 800 may use the one or more R/W devices 816 to read data from and write data to a variety of identifier devices that may be associated with an item. As described in further detail below, a UAV 800 may read data from and/or write data to an identifier device attached to an item stored in an item-storage environment. In other examples, the UAV 800 may read data from and/or write data to an identifier device attached to a rack. The identifier device attached to the rack may be associated with one or more items stored in the rack that the identifier device is attached to.

Within examples, a UAV 800 may include more than one R/W device, where each R/W devices 816 may be a different type of device. For example, the one or more R/W devices 816 that the UAV 800 is equipped with may depend on the type of identifier devices that are associated with the items stored in an item-storage environment. As explained above, the identifier device attached to an item may be any device that can identify the item that it is co-located with by, e.g., including stored information that identifies the item, such as a Unique Identification Number (UID). For example, the device may be a Radio-frequency Identification (RFID) tag. In another example, the device may be a Near Field Communication (NFC) tag. In yet other examples, the device may be a Bluetooth Low Energy (BLE) device or an electronic shelf label (ESL) device. Accordingly, the UAV 800 may be equipped with at least one device that is capable of reading data from and writing to the identifier devices that may be found in the item-storage environment. Thus, a UAV 800 may be equipped with at least one of an RFID encoder, an NFC encoder, a BLE encoder, and/or ELS encoder. In other examples, different UAVs 800 deployed in an item-storage environment may be equipped with different read/write devices 816.

Further, in some embodiments described herein, a UAV 800 may be configured to transport an item from one location to another. A UAV 800 may employ various systems and configurations in order to transport items from one location to another. For example, the UAV may include a pick-and-place mechanism, which can pick up and hold the item while the UAV is in flight, and then release the item during or after the UAV's descent. In such examples, the UAV 800 may include a robotic arm with a gripper. Other examples are also possible.

It should be understood that the examples of the different functions of a UAV that are provided herein are not intended to be limited. A UAV may be configured to provide other types of functionality without departing from the scope of the invention.

VII. Illustrative Methods and Systems

As noted above, robotic devices may be deployed in an item-storage environment to carry out various functions. The item-storage environment may be a warehouse, manufacturing facility distribution facility, retail space, among other examples. FIG. 1 depicts a warehouse environment 160, according to an example embodiment. Additionally, while only one frame of the warehouse environment is shown in FIG. 1, example implementations may be carried out in the context of a plurality of frames in a warehouse environment. Further, while various aspects of the disclosure are discussed below in the context of a warehouse, example implementations are not limited to warehouses and may extend to a variety of other item-storage environments, such as any of the item-storage environments listed herein. Further, while various aspects of the disclosure are discussed below in the context of order fulfillment, example implementations are not limited to order fulfillment and may extend to a variety of other functionalities including item rearrangement, item organization, item processing, item delivery, among other functionalities.

A. Order Processing and Fulfillment Method and System

In some examples, the warehouse 160 in FIG. 1 may be an order fulfillment center of a retailer (i.e. e-commerce retailer). Accordingly, one or more items that are sold by the retailer may be stored in the warehouse 160. The items may be in individual packages and may be stored in bins and boxes that may be arranged on racks 124 located in the warehouse 160. Additionally and/or alternatively, the items may be stored directly onto the shelves of the racks 124. The organization of the items in the warehouse 160 may be one of several different organizational schemes. For example, in smaller sized warehouses, items may be arranged according to the type of the item, such that similarly classified items are stored in proximity of each other. Further, items may be arranged in warehouses in an effort to improve efficiency of order processing and fulfillment. For example, the placement of objects in a warehouse may be carefully designed, taking into account multiple factors, such as customer demand for various products, product size, product weight, etc. Note, that the items may be organized and stored according to a variety of organizational schemes.

However, in larger sized warehouses, which may carry a wide variety of items, it may be more efficient to store items in any space that may be available in any rack, in order to expedite the process of storing items in and retrieving items from racks. Thus, a rack may contain a myriad of items, which may or may not be similarly classified items.

In an embodiment, each item stored in the warehouse 160 may be associated with a respective identifier device. The identifier device may be any device onto which data may be stored to and read from wirelessly. Further, the identifier device may be co-located with the item that it is associated with. In an example, the identifier device may be attached to the packaging of an item. For instance, an item may be delivered to the warehouse (i.e. from a factory) with the identifier device attached to the item. Further, the item may be delivered to the warehouse 160 with data indicative of the item stored onto the identifier device attached to it. For instance, the item be delivered to the warehouse 160 with a unique identification number (UID) stored on the identifier device. In some examples, the UID may be a Universal Product Code (UPC).

Accordingly, one or more robotic devices of the group of robotic devices 100 may read the identification data from the identifier device attached to each item delivered to the warehouse 160. A robotic device 700 may read the identification data from the devices using a read/write device 718, which is capable of reading data from the identifier device attached to each item. Further, the robotic device 700 may communicate to the global control system 150 the identification data that it reads from each identifier device. The global control system 150, which may be implemented on a computing device 600, may store the identification data of each item in a database stored in data storage 608. For instance, the database may include an inventory of all the items that are stored in the warehouse 160. Further, the database may include the identification data of each item in the inventory. The inventory of the items stored in the warehouse 160 may be dynamic and may be updated as an item is delivered to or shipped from the warehouse 160.

In other examples, some items may be delivered to the warehouse 160 without a device attached to each item. Accordingly, a worker or a robotic device 700 may inspect a delivered item for an identifier device that may be attached to the item. Additionally and/or alternatively, the global control system 150 may receive information (i.e. from a server of a supplier) indicating that the items included in a specific shipment delivered to the warehouse 160 do not have identifier devices attached to them. Accordingly, a worker or a robotic device 700 may attach an identifier device to each item that does not have an identifier device attached to it. Further, a worker or a robotic device 700 may use a read/write device (also referred to herein as "encoder") to write ("encode") data indicative of the item onto the identifier device attached to the item. For example, the data indicative of the item may be a unique identification number (UID). In some examples, the UID may be a Universal Product Code (UPC). Further, the worker (i.e. using computing device 600) or the robotic device 700 may communicate the data indicative of the item to the global control system 150, which may store the identification data of each item in a database.

The identifier device attached to the items stored in the warehouse 160 may be any device that can identify the item that it is attached to by, e.g., including stored information that identifies the item, such as a Unique Identification Number (UID). Further, the identifier devices may be "read-write" devices such that more data may be stored on the device or such that the existing data on the device may be modified. For example, the identifier device attached to an item may be a Radio-Frequency Identification (RFID) tag. An RFID tag may be a passive, active, or battery-assisted passive tag. The identifier device attached may also be a Near Field Communication (NFC) tag, a Bluetooth Low Energy (BLE) beacon, and/or an electronic shelf label (ESL).

Further, as explained above, robotic devices (i.e. of the group of robots 100) may transport items from one location to another in a warehouse 160. Accordingly, the robotic devices may transport items to a location near the racks 124, where a worker or a robotic device may store the items in an empty location in the racks 124. Further, the robotic device or the worker (i.e. using a computing device 600) storing an item in a rack may communicate to the global control system 150 the specific rack 124 that the item was stored in. The global control system 150 may associate the identification data of the item with the data indicative of the specific rack that the item was stored in.

Accordingly, the global control system 150 may keep track of the specific rack 124 that each item is stored in. For example, each rack 124 in the warehouse 160 may be associated with a unique identifier, such as a serial number. The global control system 150 may maintain a database, which may be stored in data storage 608, of all the racks 124 located in a warehouse 160. The database may identify each rack 124 using the respective unique identifier of the rack. The database of the racks may also include location information indicative of the location of each rack 124 in the warehouse 160. For example, the database may include the GPS coordinates of the location of each rack 124 in the warehouse 160. In other examples, the location information of each rack 124 may be Cartesian coordinates or waypoints.

Accordingly, the global system 150 may identify each rack by a unique identifier, and may also determine the location of each rack 124.

Further, the global control system 150 may use the data stored in the databases to associate the data indicative of the items stored in the warehouse 160 and the data indicative of the racks in the warehouse 160. Note, that each of the databases described herein may include other data. For instance, each database may include details about each item, such as a type of the item, a classification of the item, a size of the item, a weight of the item, dimensions of the item, a date the item was delivered to the warehouse 160, a number of units of the item, a manufacturer of the item, and where the item is sold (i.e. online website and/or brick and mortar store). Other information indicative of the items may also be found in the databases.

Furthermore, UAVs may be deployed in the warehouse 160, as part of the group of robots 100, to carry out various functions. Example embodiments may provide for a method and systems for selective encoding of identifier devices using UAVs. In an embodiment, UAVs may be deployed in a warehouse as part of an order processing and fulfillment system. One or more robotic devices, such as UAVs, may be used in an order processing and fulfillment system.

Figure 9:
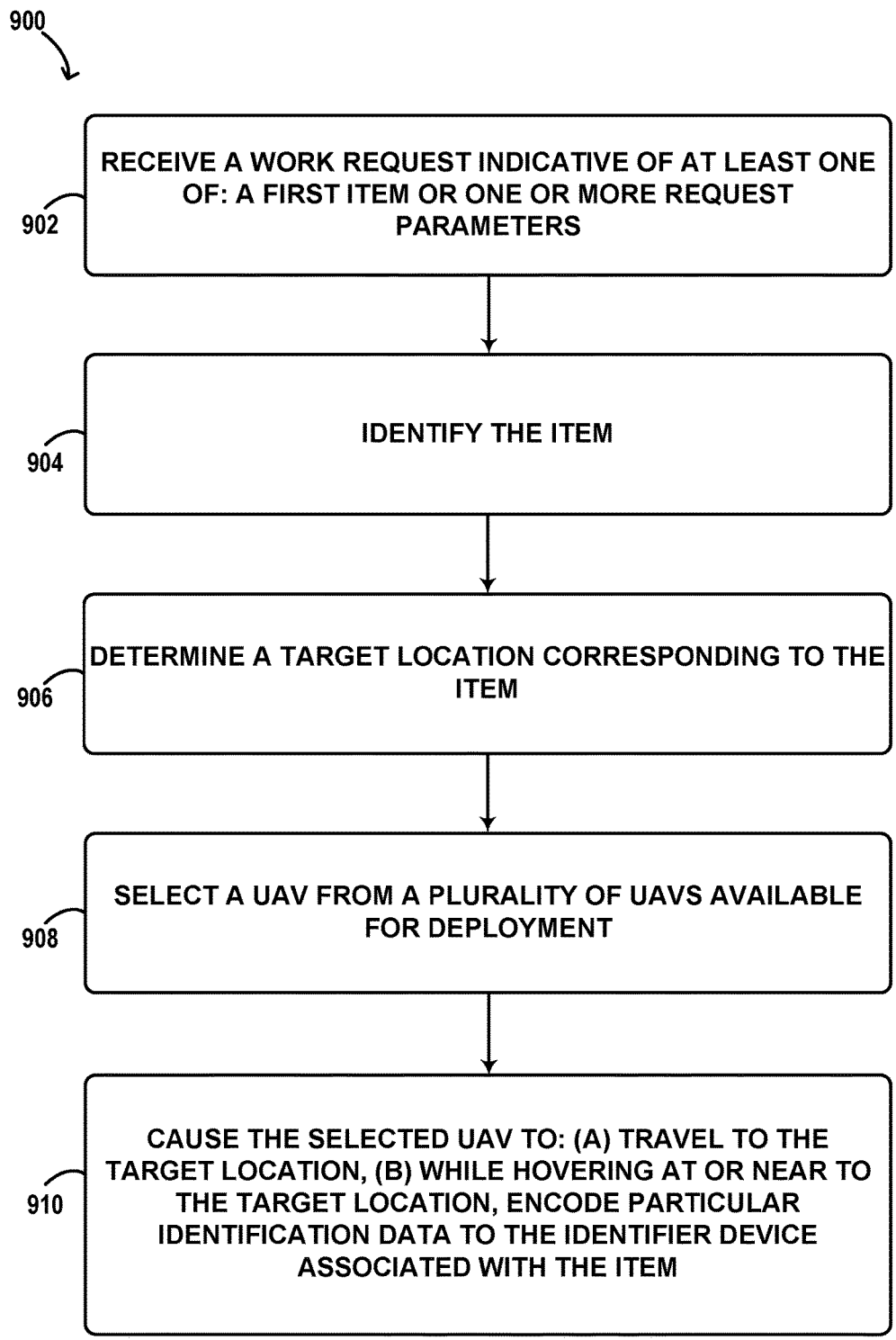
FIG. 9 is a flowchart illustrating a method, according to an example embodiment.

FIG. 9 is a flow chart illustrating a method 900, according to an example embodiment. Illustrative methods, such as method 900, may be carried out in whole or in part by the warehousing system 170. However, it should be understood that example methods, such as method 900, may be carried out by other entities or combinations of entities (i.e., by other computing devices and/or combinations of computing devices), without departing from the scope of the invention. Further, warehousing system 170 may carry out method 900 to execute a variety of functions in an item-storage environment. For example, warehousing system 170 may carry out method 900 to process and fulfill an order, move item in an item-storage environment, and/or modify the information on an identifier device co-located with an item.

Figure 10:
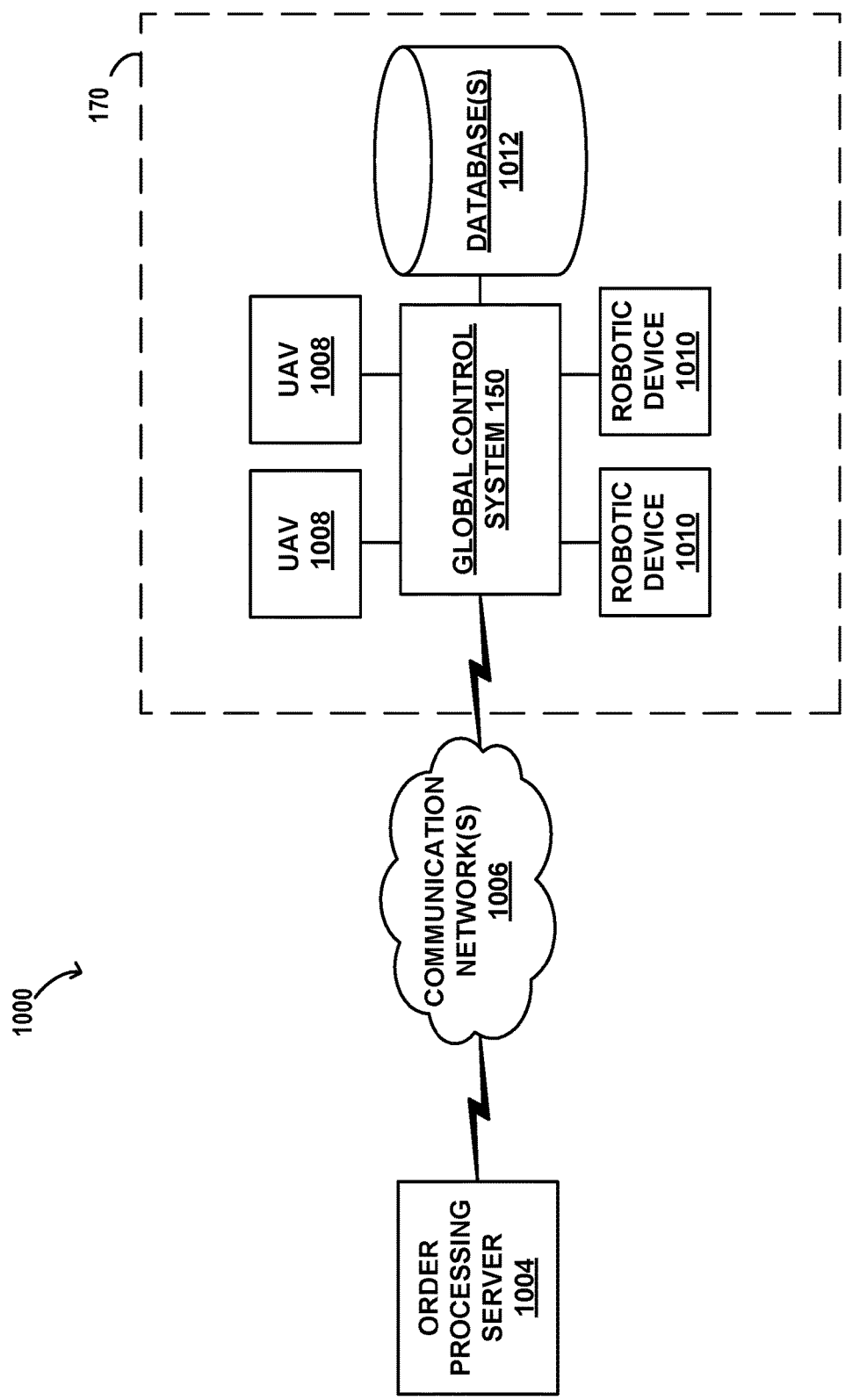
FIG. 10 is a simplified block diagram illustrating components of an order processing and fulfillment system, according to an example embodiment.

In an embodiment, warehousing system 170 may carry out method 900 to process and fulfill an order. FIG. 10 is a simplified block diagram illustrating an order fulfillment system 1000, according to an example embodiment. In an illustrative embodiment, the warehousing system 170 may be part of the order fulfillment system 1000. In such an embodiment, the global control system 150 may function as the controller of the warehousing system 170. As illustrated in FIG. 10, the global control system 150 may allow for interaction with, control of, and/or utilization of the network of the group of robots 100, which are represented in FIG. 10 as UAVs 1008 and robotic devices 1010. The global control system 150 may utilize some or all of the group of robots 100 in the order fulfillment system 1000. Note that for the sake of simplicity, only two UAVs 1008 and two robotic devices 1010 are illustrated in FIG. 10. However, the order fulfillment system 1000 may include more or less UAVs and robotic devices.

Further, the global control system 150, which may be implemented on computing device 600, may allow for human-controlled dispatch of one or more of the UAVs 1008 and/or the robotic devices 1010 via a user interface 604. As such, the order fulfillment system 1000 may include or otherwise provide a user interface (UI) via which a user can access and/or control the UAVs 1008 and/or the robotic devices 1010.

Further, the global control system 150 may coordinate the deployment of UAVs 1008 and robotic devices 1010 for order fulfillment and/or processing. Accordingly, the global control system 150 may be configured to send instructions to UAVs 1008 and robotic devices 1010. For example, the global control system 150 could communicate with some or all of UAVs 1008 and robotic devices 1010 through wired connections or other types of communication channels as well or instead, including the described network protocols.

Returning to FIG. 9, method 900 may involve receiving a work request indicative of at least one of: a first item or one or more request parameters, as shown by block 902. Method 900 may further involve identifying the item included in the work request, as shown by block 904. Further, the method 900 includes identifying a target location corresponding to the item, as shown by block 906. As shown by block 908, a UAV may be selected from a plurality of UAVs 1008 available for deployment. Finally, the method may include causing the selected UAV 1008 to travel to the target location and while hovering at or near to the target location to encode or write particular identification data to the identifier device associated with the item. Note that method 900 is described with respect to a first ordered item. However, an order may include one or more items. Accordingly, method 900 may be carried out to fulfill an order of more than one item by sequentially and/or simultaneously executing method 900.

At block 902 of method 900, the global control system 150 may receive a work request. As illustrated in FIG. 10, the global control system 150 may receive the work request from an order processing server 1004 via a communication network(s) 1006. In an example, the global control system 150 may receive a work request from an order processing server 1004 of a retailer, such as an e-commerce retailer. The order processing server 1004 may be implemented on a computing device, such as computing device 600.

The communication network(s) 1006 may be one or more wireless interfaces and/or one or more wireline interfaces. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Accordingly, the order processing server 1004 may be connected to the warehousing system 170 via the Internet, for example.

Furthermore, the work request may include information about the type of the work request, an item included in the work request, and parameters of the work request. For example, the type of work request received from an order processing server 1004 may be an order fulfillment request. The order fulfillment request may include one or more ordered items. The one or more ordered items may be sold by the retailer and may be stored in the warehouse 160.

In some examples, the order processing server 1004 may identify the ordered items before sending the order fulfillment request to the warehousing system 170 of the order fulfillment system 1000. The order processing server 1004 may also determine the warehouse the item is stored in. Further, the order processing server 1004 may also determine whether an item is in stock at a particular warehouse. Accordingly, once the order processing server 1004 has identified the warehouse that the ordered items are located in, the order processing server 1004 may send an order fulfillment request to the warehousing system 170 of the specific warehouse that an ordered item is stored in. In some examples, the ordered items of a single order may be located in more than warehouse. In such examples, the order processing server may send an order fulfillment request to the warehousing system 170 implemented in each of the warehouses.

The global control system 150 may identify the item included in the work request, as shown by block 904. For example, the order fulfillment request may identify the ordered item by a unique identification number (UID). In some examples, the UID may be a universal product code (UPC). Additionally and/or alternatively, the ordered item may be identified by an identification nomenclature unique to the retailer or manufacturer. As such, each item sold by the retailer may have one or more UIDs associated with it. The global control system 150 may use the UID of the ordered item to identify the ordered item in the inventory database 1012. As explained above, the global control system 150 may maintain, in a database, an inventory of all the items stored in a warehouse 160. Accordingly, the databases 1012 may be any of the databases described above. Further, the order fulfillment request may include one or more order parameters. For example, the order parameters may include an order number, a customer ID, a time of order, and an order fulfillment deadline.

The global control system 150 may then identify a target location corresponding to the ordered item, as shown by block 906. The global control system 150 may use the UID of the ordered item to determine the specific rack 124 that the ordered item is stored in. The global control system 150 may look-up the location information of the specific rack 124 in the warehouse 160 from the database(s) 1012 using the UID of the ordered item. The location information of the rack 124 may be GPS coordinates and/or Cartesian coordinates. Accordingly, the target location may be at or near to the location of the rack 124 that the ordered item is stored in.

Further, the global control system 150 may select a UAV from a plurality of UAVs available for deployment, as shown by block 908. As illustrated in FIG. 10, the warehousing system 170 may include more than one UAV 1008. The global control system 150 may select a UAV 1008 from the plurality of UAVs that are available for deployment based on one or more factors.

In an embodiment, the global control system 150 may select a UAV 1008 that is configured to selectively encode (magnetize) an identifier device co-located with an item. For example, the selected UAV 1008 may be a UAV that is configured to fly or hover at or near all or nearly all of the locations in the warehouse. Further, the selected UAV 1008 may be able to access all or nearly all the identifier devices associated with the items located in the warehouse.

Within embodiments, the warehouse may include more than one UAV 1008 configured to selectively encode an identifier device. Accordingly, the global control system 150 may select a UAV 1008 from all such UAVs available based on the relative location of each UAV with respect to the target location. For example, the global control system 150 may calculate the direct flight path distance from the location of each UAV 1008 to the target location. In such an example, the global control system 150 may select the nearest UAV 1008 to the target location.

Alternatively, the global control system may select an available UAV 1008 that is within a certain distance from the rack (which may or may not be the closest). In some cases the nearest UAV 1008 to the target location may have already received instructions to fly to a different target location. Accordingly, the global control system 150 may select the nearest available UAV 1008. In some examples, a UAV 1008 may be flying in the warehouse 160 in idle mode. For instance, one or more of the UAVs 1008 may be assigned to fly, either continuously (during specific times) or periodically, in determined coordinates. For example, a greater number of UAVs may fly over racks where popular items are stored than the number of UAVs that fly over racks where less popular items are stored.

In a further aspect, one or more UAVs 1008 may be idling in a housing unit that includes a deployment system. In general, a deployment system may take the form of or include a system for physically launching a UAV 1008. Further, a deployment system may be configured to launch one particular UAV 1008, or to launch multiple UAVs 1008. A deployment system may further be configured to provide additional functions, including for example, diagnostic-related functions such as verifying system functionality of the UAV 1008, and/or maintaining devices or other items that are housed in the UAV 1008. In some embodiments, the deployment systems and their corresponding UAVs 1008 may be strategically distributed throughout an area of the warehouse 160.

In another embodiment, the global control system 150 may select a UAV 1008 from a plurality of UAVs available based on the type of the work request. For example, the nearest idle UAV 1008 equipped with a read/write device 816 may be selected when the work request is an order fulfillment request. Further, the items in the warehouse 160 may have different types of identifier devices attached to them. Accordingly, the global control system 150 may select the UAV 1008 that is equipped with a read/write device 816 that is configured to read data from and write data to the type of identifier device attached to the ordered item. For example, an RFID tag may be the identifier device that is attached to an ordered item. Accordingly, the global control system 150 may select a UAV 1008 that is equipped with an RFID reader/writer 816.

Returning to FIG. 9, once the UAV 1008 is selected, the method may include causing the selected UAV 1008 to travel to the target location, as shown by block 910. As explained above, the target location may at or near to the location of the rack 124 that the ordered item is stored in. The global control system 150 may communicate the target location to the selected UAV 1008. Thus, the UAV 1008 may fly to or near to the location of the rack 124 that the ordered item is stored in.

In an example, the UAV 1008 may use a navigation module 815 to locate the rack 124. In such examples, the global control system 150 may send the UAV 1008 the location information of the rack 124. The location information may be the coordinates (i.e. waypoints, Cartesian coordinates, GPS coordinates) of the rack 124. The global control system 150 may also send the UAV 1008 any flight restrictions, such as danger zones, specific altitude(s) to fly at, a maximum speed that the UAV 1008 may fly at, etc. The navigation module 815 may use the information received from the global control system 150 to generate the flight plan of the UAV 1008 from its current location to the location of the rack 124. The navigation module 815 may also use other information such as the location of the other UAVs and/or robotic devices in generating the flight plan. The flight plan may include the flight path from the current location of the UAV 1008 to the target location. The flight plan may also include flight parameters such as the altitude and speed of the UAV 1008 during its flight.

In other examples, the global control system 150 may generate the flight plan of the UAV 1008. The flight plan may include a flight path from the UAV 1008's current location to the target location. The global control system 150 may use information such as the current location of the selected UAV 1008, the target location (i.e. location of the rack 124), the location of the other UAVs, the respective flight paths of the other UAVs, the time constraints on an order etc. to generate the flight path of the UAV 1008. The global control system 150 may communicate the generated flight plan to the UAV 1008. The flight plan may include the flight path from the current location of the UAV 1008 to the target location. The flight plan may also include flight parameters such as the altitude and speed of the UAV 1008 during its flight.

Accordingly, the UAV 1008 may fly along the generated flight path to reach the target location. Once the UAV 1008 is at the target location, the UAV 1008 may hover near or at the target location. While hovering near the rack 124, the UAV 1008 may locate the ordered item on the rack. As explained above, a rack may contain a myriad of items. Accordingly, the UAV 1008 may need to determine the precise location of the ordered item in the rack 124.

In an embodiment, the UAV 1008 may use the identifier devices co-located with the ordered item to determine the precise location of the ordered item. More specifically, the UAV 1008 may use a read/write device 816 to read identification data from the identifier devices co-located with the items stored on the rack. The UAV 1008 may compare the identification data read from the identifier devices with the identification data of the ordered item. The UAV 1008 may continue to read identification data from the identifier devices and compare it to the identification data of the ordered item till the comparison results in a match.

In some embodiments, due to an error in the inventory database, an ordered item may not be located in the rack 124 specified in the inventory database. Accordingly, the UAV 1008 may not locate the item at the specified target area. Thus, the UAV 1008 may communicate to the global control system 150 that an item was not found in the specified rack 124. In some examples, the UAV 1008 may determine that the ordered item is not located at a specific location after searching the location for the item for a specified period of time.

Returning to FIG. 9, once the UAV 1008 has located the ordered item by reading identification data from the identifier device co-located with the item, the UAV 1008 may further, while hovering at or near the target location, encode particular identification data to the identifier device associated with the item, as shown by block 910. Within examples, the UAV 1008 may use the read/write device 816 to write data to the identifier device associated with the item. In the example of the ordered item, the UAV 1008 may use the read/write device 816 to write the order data to the identifier device attached to the item. The order data may be data such as order number, a customer ID of the customer requesting the order, the ordered items, a time of order, and an order fulfillment deadline, shipping information, and order priority, among other data. As explained elsewhere herein, other types of data (i.e. depending on the work request type) may be encoded to the identifier device associated with an item.

Further, the UAV 1008, while hovering at or near the target location, may determine a precise location of the item. For example, the UAV 1008 may determine the precise location of the item by measuring the distance that the item is away from the UAV 1008. For instance, the UAV 1008 may use ultrasonic sensor(s) 804 to measure the distance that the item is away from the UAV 1008. The UAV 1008 may determine location information of the item based on the UAV 1008's current location and the distance of the item from the UAV 1008. In another example, the UAV 1008 may measure the signal strength of the signal that is received at the read/write device 816 from the identifier device associated with the item. In yet another example, the UAV 1008 may use one or more imaging system(s) 808 to confirm that the ordered item is located at the precise location determined by the UAV 1008.

Subsequently, the UAV 1008 may communicate location information of the precise location of the item to the global control system 150. The location information may be Cartesian coordinates, GPS coordinates, and/or waypoints. For example, the coordinates of the item in the rack 124 may be Cartesian coordinates from a specific point on the rack 124 (i.e. the top or the bottom of the rack). Accordingly, the global control system 150 may determine the precise location of an item stored in the rack 124. The global control system 150 may store the location information of the item in a database. Further, the global control system 150 may associate the data with the identification data of the item and the location data of the rack 124.

Furthermore, the global control system 150 may select a robotic device, from a plurality of robotic devices, to retrieve the item. The global control system 150 may select the robotic device based on a number of factors. For example, the selection of the robotic device may depend on the size, dimensions, and weight of the ordered item. In particular, the global control system 150 may select a robotic device that may capable of transporting the item from one location to another. Further, the selection of the robotic device may depend on the location of the plurality of the robotic devices with respect to the target location. For example, the global control system 150 may calculate the direct path distance from the location of each robotic device to the target location. In such an example, the global control system 150 may select the nearest available robotic device to the target location.

In an example, the global control system may select a UAV 1008 to retrieve the item. Further, the selected UAV 1008 may be configured to deliver the item to a location determined by the global control system 150. The UAV 1008 configured to retrieve and deliver an item may be referred to as a "collector UAV". The collector UAV may be a different UAV than the UAV that is configured to selectively encode identifier devices. The UAV 1008 that is configured to selectively encode identifier devices may be referred to as an "encoder UAV." The collector UAV may be larger than the encoder UAV, such that the collector UAV may be able to retrieve items.

Figure 11:
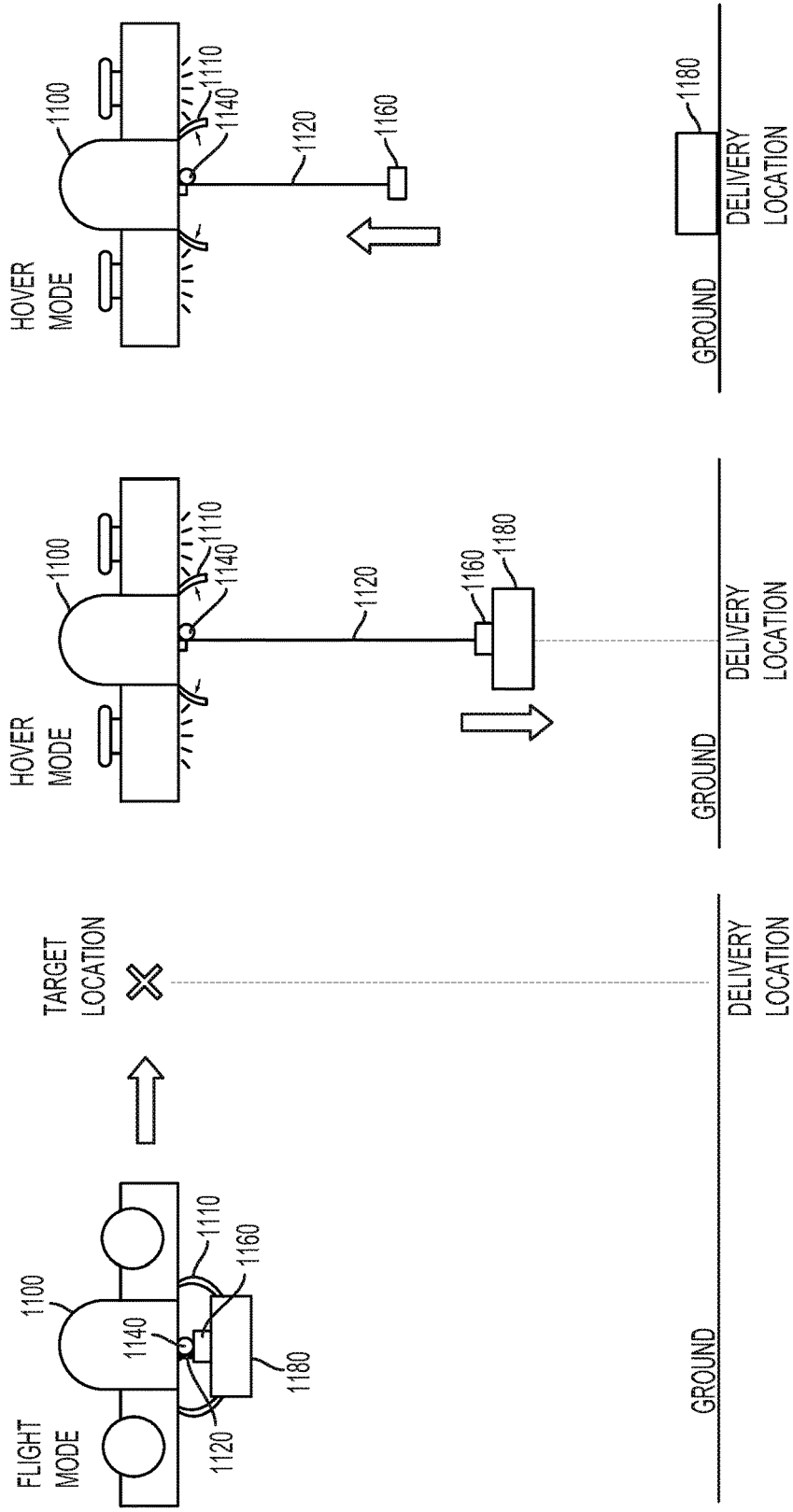
FIGS. 11A, 11B, and 11C show a UAV that includes an item-retrieving system, according to an example embodiment.

As illustrated in FIG. 11 according to an example embodiment, a collector UAV 1100 may include an item-retrieving system. The item-retrieving system may include a tether 1120, a tether-deployment mechanism 1140, and an item-release device 1160 coupled to the tether. The item-release device 1160 can function to alternately secure an item 1180 and release the item 1180 upon delivery. The tether-deployment mechanism 1140 can function to unreel and retract the tether 1120 such that the item-release device 1160 can be lowered to the ground and retracted back to the collector UAV 1100.

The item-retrieving system may function to hold the item 1180 against or close to the bottom of the UAV 1100, or even inside the UAV 1100, during flight from a launch site to a target location. The target location may be a point in space directly above a desired delivery location. Then, when the UAV 1100 reaches the target location, the UAV 1100's control system may operate the tether-deployment mechanism 1140 such that the item 1180, secured by the item-release device 1160, is suspended by the tether and lowered to the ground. In an example, the UAV 1100 may detect that the item 1180 has been lowered to a point where it is at or near the ground (e.g., at the delivery location). In response to detecting the item 1180 is at or near the ground, the item-release device 1160 may release the item 1180, and thereby detach the item 1180 from the tether 1120. After releasing the item 1180, the tether-deployment mechanism 1140 may retract the item-release device 1160 to the UAV 1100. For example, the tether-deployment mechanism 1140 may include a winch that reels the tether 1120 on and off of a spool to lower and raise the item-release device 1160.

The item-release device 1160 can also include an item-release system, which can include one or more electromechanical components that can be manipulated to alternately secure the item 1180 or release the item 1180. The item-retrieving system can include one or more actuator(s) (e.g., a solenoid, motor, hydraulic component, etc.), grippers (e.g., clamps, opposable arms, etc.), retaining rods or hooks, or other components. The actuator may be mechanically linked to the retaining rod and/or gripping surface to facilitate moving the rod and/or gripper between different positions in response to electronically generated signals (e.g., from the processor 810). For example, in one position, component(s) of the item release system can couple the item-release device 1160 to the item 1180, and in another position, component(s) of the payload release system can release the item 1180 from the item-release device 1160.

The item-release system may secure the item 1180 to the item-release device 1160 in different ways. In some examples, grippers (i.e. gripper 1110), fasteners, or other engaging surfaces function to secure the item 1180 (e.g., by applying pressure to the item or by engaging corresponding surfaces of the item 1180). As explained above, in some cases, the item 1180 may include one or more apertures or other standardized interfacing features configured to interface with the item-release device 1160. Thus, the item-release device 1160 may include prongs or the like that interface with the item 1180 by passing through the item's apertures (or otherwise engaging standardized features). The item-release device 1160 can also release the item 1180 by disengaging the grippers or engaging surfaces, or by detaching from the item's standardized features.

In some cases, the retaining rod may include a hook that is rotated between different positions via the actuator. In one position, the rod can engage an aperture of an item mount attachment while the mount attachment is inserted within a channel formed in a housing of the item-release device 1160. The mount attachment may be a substrate or other structure that extends from a top surface of the item 1180 and has an aperture formed therein for receiving the rod. While the lowering the item 1180 from the UAV 1100, the mount attachment can be inserted into the channel and the rod can cross through the aperture (e.g., by crossing through the channel) so as to engage the item 1180. The rod can then be withdrawn from the channel to release the item 1180 once the item is on the ground (or other target surface).

Additionally or alternatively, the item-release device 1160 may include opposable arms. The opposable arms can be used to grip the item 1180 while lowering the item 1180 from the UAV 1100, and then can be separated to release the item 1180 once the item 1180 is on the ground. Additionally or alternatively, the release device 1160 may also take the form of a container, bucket, cage, or other enclosure with a bottom (or other enclosing surface) that can be opened and/or removed. While the item 1180 is lowered from the UAV 1100, the item 1180 can be secured within the enclosure, and then the bottom of the enclosure can be opened once item 1180 is on the ground. Additionally or alternatively, the item release device 1160 may include one or more magnetic features, which may or may not be activated/deactivated in response to an input, such as permanent magnets, paramagnetic materials, electromagnets, etc. In such an example, the item 1180 may also include magnetic features, which may or may not be activated/deactivated in response to an input, and the item 1290 can be secured to the item-release device 1160 via magnetic attractive forces between such h magnetic features and then the item 1180 can be released by deactivating at least one of the magnetic features or by overcoming the attractive force. Additionally or alternatively, the item-release device 1160 may include an engaging rod or hook that engages a corresponding depression or aperture in the item 1180. For example, the item 1180 may be formed to include one or more loops along its top or side surfaces. To secure the item 1180, the rod(s) or hook(s) of the item-release device 1160 can be maneuvered to engage such loops. Similarly, the item can be released by manipulating the rod(s) or hook(s) to disengage the loops. In some examples, the rod, hook, or other item-engaging mechanism may be implemented as: a coupling link with a portion that opens and closes, similar to a carabiner; a hook mounted below the item-release device 1160 (i.e., not mounted to pass within a channel); and/or a closed loop that engages a hook on the item 1180 and then translates and/or rotates to disengage from the hook during item 1180's release. The item-release device 1160 may additionally or alternatively include other examples of devices, mechanisms, features, and systems may also be used to alternately engage an item via a mechanical connection and, in response to determining it is time to release the item, release the item via manipulation of one or more components on the item-release device 1160 and/or the item.

Various other types of item-retrieving systems are also possible. The form of a item-retrieving system for a particular implementation may depend on, for example, the types of items to be delivered, For example, the item-release device 1160 may be positioned on the tether 1120 or at the top of the tether 1120, and may be operable to cut the tether or release the tether from the UAV 1100 when the payload 1180 is at or near the ground.

Accordingly, the global control system 150 may select a collector UAV 1100 to retrieve an item. The global control system 150 may send the UAV 1100 the location of the target item. The global control system may 150 may also send the UAV 1100 the delivery location and the target location associated with the delivery location.

The selected UAV 1100 may fly to or near to the location of the target item. At the location, the UAV 1100 may operate in hover mode. The UAV 1100 may then use the item retrieving system to retrieve the target item. Once the item is retrieved, the UAV 1100 may fly towards the target location associated with the delivery location. At the target location, the UAV 1100 may operate in hover mode. The UAV 1100 may then use the item retrieving system to release the item to at or near to the delivery location. Within examples, the delivery location may be a sorting station in the warehouse. Items delivered to the sorting station may be accessed by other robotic devices for further processing, as described below.

Figure 12:
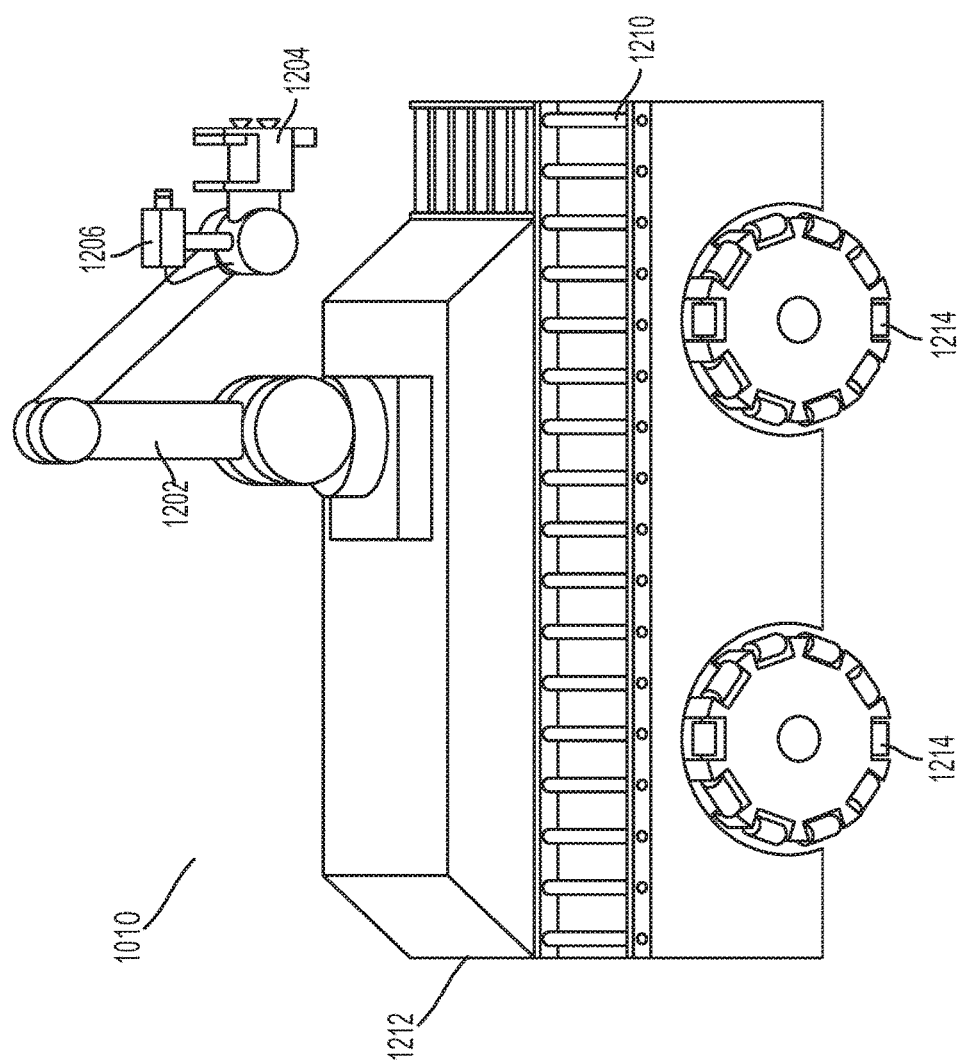
FIG. 12 shows an autonomous guided vehicle, according to an example embodiment.

In another example, the global control system 150 may select a robotic device 1010 to retrieve the item. FIG. 12 illustrates the robotic device 1010, according to an example embodiment. In an embodiment, the robotic device 1010 may be configured to retrieve items from racks and may be referred to herein as a "robotic collector", "collector robot", or "collector." In some examples, a robotic collector 1010 may include one or more sensors, one or more read/write devices, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick up positions for objects, and/or planning collision-free trajectories for the one or more robotic arms and/or a mobile base.

The robotic collector 1010 may include a robotic arm 1202 with a gripping component 1204 for gripping objects within the environment. The robotic arm 1202 may use the gripping component 1204 to pick up and place boxes to load or unload trucks or other containers. The gripping component 1204 may also be used to "pick" items, which may be stored in racks. The robotic collector 1010 may also include a moveable cart 1212 with wheels 1214 for locomotion. The wheels 1214 may be holonomic wheels that allow the cart 1212 to move with two degrees of freedom. Additionally, a wrap around front conveyor belt 1210 may be included on the holonomic cart 1212. In some examples, the wrap around front conveyer belt may allow the robotic collector 1010 to unload or load boxes from or to a truck container, pallet, or rack without having to rotate gripper 1204.

In further examples, a sensing system of the robotic collector 1010 may use one or more sensors attached to a robotic arm 1202 which may be two-dimensional (2D) sensors and/or 3D depth sensors that sense information about the environment as the robotic arm 1202 moves. The sensing system may determine information about the environment that can be used by the robotic collector 1010 to pick and move boxes efficiently. The robotic collector 1010 may have a controller, such as controller 708, that may be located on the device that receives instructions from the global control system 150. In further examples, scans from one or more 2D or 3D sensors with fixed mounts on a mobile base, such as a navigation sensors, safety sensor, and one or more sensors mounted on a robotic arm may be integrated to build up a digital model of the environment, including the sides, floor, ceiling, and/or front wall of a truck or other container. Using this information, the control system of the robotic collector 1010 may cause the mobile base to navigate into a position for unloading or loading.

In further examples, the robotic arm 1202 may be equipped with a gripper 1204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures. The robotic collector 1010 may additionally include a read/write device 1206. The read/write device may be used to read data from or write data to a device associated with an item in an item-storage environment. The read/write device 1206 may be any device that is configured to read data from or write data to the devices described herein that may be associated with an item in an item-storage environment.

The robotic collector 1010 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Accordingly, the selected robotic collector 1010 may receive instructions from the global control system 150 to retrieve the ordered item from the rack that it's stored in. The instructions may include identification data of the item. The instructions may also include location information of the rack and of the item. For example, the location information of the item and the rack may be GPS coordinates, Cartesian coordinates, and/or altitude coordinates. In some examples, the precise location of the item on the rack may be a defined with respect to the location of the rack. For instance, the location of the rack that the ordered item is stored in may be represented by GPS coordinates, whereas the location of the item on the rack may be in Cartesian coordinates from a specific point on the rack.

In some examples, the controller 708 of the robotic collector 1010 may determine a path to the precise location of the item. In other examples, the global control system 150 may determine the path that the robotic collector 1010 should follow to reach the precise location of the item. The global control system 150 may also send the robotic collector 1010 any space restrictions such as danger zones, maximum speed, etc.

Accordingly, the robotic collector 1010 may travel, along its determined path, to or near to the precise location of the item. Once the robotic collector 1010 reaches the target location, the robotic collector 1010 may use the read/write device 1206 to read identification data from the identifier device of the item to confirm that the robotic collector 1010 is picking the correct item. The robotic collector 1010 may compare the identification data that is read from the identifier device of the item to the identification data of the item that is received from the global control system 150. Once the control system of the robotic collector 1010 determines that the item is the correct item, the robotic collector 1010 may use the gripping component 1204 to retrieve the item from the rack. The robotic collector 1010 may place the retrieved item in the cart 1212. The robotic collector 1010 may communicate a confirmation to the global control system 150 that the item was retrieved.

The global control system 150 may send instructions to the robotic collector 1010 to transport the retrieved item to another location. For instance, the global control system 150 may send instructions to the robotic collector 1010 to transport the item to a sorting station for further processing. The global control system 150 may also send instructions to the robotic collector 1010 to retrieve one or more items from other racks. Subsequently, the robotic collector 1010 may transport the one or more items to the sorting station for further processing.

At the sorting station, one or more robotic devices may retrieve the items from the cart 1212 of the robotic collector 1010. Furthermore, the robotic devices at the sorting station may include one or more read/write devices. The read/write device may be used to read data from or write data to the identifier device attached to each item. The read/write device may be any device that is configured to read data from or write data to the devices described herein that may be attached to an item. Accordingly, by reading data from an identifier device attached to an item, the robotic devices at the sorting station may quickly identify the item. The robotic device at the sorting station may also read information indicative of the work request type and the work request parameters from the device. For example, the robotic device may determine an order that an item is part of. The robotic device may also determine the order parameters of the order that the item is included in. Accordingly, the robotic devices at the sorting station may quickly identify items that are part of the same order, and may sort the items accordingly.

As illustrated in FIG. 1, robotic device 122 may be the robotic device at a sorting station. As illustrated, the robotic device 122 may sort the items 140. Further, the robotic device 122 may move the items 140 to the conveyer belt 132. The conveyer belt 132 may transport the items 140 to a different location for further processing.

One of ordinary skill in the art may determine the other phases of processing in a warehouse depending on the work request type. At each phase of processing, a robotic device may use a read/write device to identify the item and determine the work request type and/or parameters. The information read from the device attached to each item may be used by a controller of the robotic device to determine the actions that the robotic device may execute. Further, the robotic device at each phase may send a confirmation to the global control system 150 that a processing phase is complete.

B. Data Modification

In another embodiment, the warehousing system 170 may carry out method 900 in a brick and mortar store. For example, the brick and mortar store may be a store such a supermarket, drugstore, or any other store in which items are stored on racks and/or shelves. Further, one or more identifier devices may be attached to each rack and shelf in the store. For example, the identifier device may be an electronic shelf label (ESL). The ESL device may include display such an e-ink or an LCD display. The ESL device may also include a communication interface, which may include a wireless interface. Such wireless interfaces may provide for communication under one or more wireless communication protocols, such as Bluetooth, a radio-frequency ID (RFID) protocol, near-field communication (NFC), and/or other wireless communication protocols.

Within examples, the ESL may be associated with one or more items stored on the shelf or in a rack that the ESL is attached to. The ESL device may display information indicative of the items that it's associated with. For instance, the one or more items that the ESL device is associated with may be identical items. As such, the ESL device may display information such as the type of item, the name of the item, the manufacturer of the item, the number of units of the item that are stock, and/or the price of the item. Further, as more than one type of item may be stored on a single rack, more than one ESL device may be attached to a rack or shelf. In some examples, each ESL device may be associated with a type of item stored in the rack or shelf.

In an example, the warehousing system 170 may carry out method 900 in order to initialize and/or update the information that is displayed by an ESL. The global control system 150 may determine that the information, which is displayed by an ESL, may need to be initialized or updated. For instance, the global control system 150 may receive information (i.e. from a warehouse server) that a shipment of a new item is being delivered to the store. The information may include the shipment date, the type of item, the number of items included in the shipment, and the manufacturer's suggested retail price (MSRP). In another example, the global control system 150 may receive information indicative of a price change of an item. For example, the global control system 150 may receive an input indicative of the price change from a user of the warehousing system 170 via a user interface 604. Accordingly, the warehousing system 170 may carry out method 900 in order to initialize or update the ESL display that attached to the rack that the specific item will be or is stored in.

Returning to FIG. 9, method 900 may involve receiving a work request indicative of at least one of: a first item or one or more request parameters, as shown by block 902. For example, the global control system 150 may receive a work request that requests update the information displayed by a specific ESL associated with the first item specified by the work request. The ESL may be associated with one or more items that are stored in the rack that the ESL is attached to. In some examples, the work request may identify an item using a UID. Further, the request parameters may specify which information displayed on the ESL is to be updated. For example, the request parameters may include an updated price, updated number of units, updated item classification. Other parameters are also possible.

Method 900 may further involve identifying the item included in the work request, as shown by block 904. For example, the request may identify the specified item by a unique identification number (UID). In some examples, the UID may be a universal product code (UPC). Additionally and/or alternatively, the specified item may be identified by an identification nomenclature unique to the e-commerce retailer. As such, each item sold by the retailer may have one or more UIDs associated with it. The global control system 150 may use the UID of the ordered item to identify the ordered item in the inventory database 1012. As explained above, the global control system 150 may maintain, in a database, an inventory of all the items stored in a store. Accordingly, the databases 1012 may be any of the databases described above.

Further, the method 900 includes identifying a target location corresponding to the item, as shown by block 906. The global control system 150 may use the UID of the specified item to determine the specific rack that the specified item is stored in, as the global control system 150 may look-up the location of each rack in the store from the database(s) 1012 using the UID of the specified item. If the specified item is a new item that is not associated with a rack, the global control system 150 may find an empty rack in the database 1012. Further, the global control system 150 may associate the specified item with the empty rack. The location information of the rack may be represented as GPS coordinates, Cartesian coordinates, and/or waypoints.

The database may also include information indicative of the identifier device associated with the specified item. For example, the information may be a serial number of the identifier device. The information indicative of the identifier device may be associated with the data of the item that the device is associated with. Further, the information indicative of the identifier device may be associated with the location information of the rack that the identifier device is attached to. In some examples, the database may include precise location information of the identifier device on the rack. This information may be obtained, for instance, at the time that the identifier device was first attached to the rack. The information may have also been obtained from a previous execution of method 900. Additionally and/or alternatively, the methods described above for precisely locating an item may also be used to precisely locate the identifier device.

As shown by block 908, a UAV 1008 may be selected from a plurality of UAVs available for deployment. The global control system 150 may select a UAV 1008 from the plurality of UAVs that are available for deployment based on one or more factors. The selected UAV may be an "encoder UAV." The one or more factors may be similar to the one or more factors that the global control system 150 may use to select a UAV 1008 for order fulfillment.

Finally, the method may include causing the selected UAV 1008 to travel to the target location and while hovering at or near to the target location to encode or write particular identification data to the identifier device associated with the item. The target location may be the location of the rack or the precise location of the identifier device. If the target location is the location of the rack, the UAV 1008 may use one or methods described above for locating an identifier device.

Once the UAV 1008 has located the specified identifier device, the UAV 1008 may further, while hovering at or near the target location, encode particular identification data to the identifier device associated with the item, as shown by block 910. Within examples, the UAV 1008 may use the read/write device 816 to write data to the identifier device associated with the item. In the example of the ordered item, the UAV 1008 may use the read/write device 816 to write data to the ESL attached to the rack. The data may be data that the ESL displays. For instance, the data may be data such as the type of item, the name of the item, the manufacturer of the item, the number of units of the item that are stock, and/or the price of the item As explained elsewhere herein, other types of data (i.e. depending on the work request type) may be encoded to the identifier device associated with an item.

In another embodiment, the identifier device that may be attached to a shelf on which an item is stored may be a Bluetooth Low Energy (BLE) beacon. Accordingly, a UAV may fly to the location of the rack, identify the shelf on which the targeted item is located, and encode data to the identifier device (i.e. BLE beacon) associated with the item. Upon receiving the data, the BLE beacon may be configured to transmit packets, which contain information indicative of the item, the order, and the location of the shelf, that enable the collecting robotic device to locate the targeted item. In another embodiment, the packets may include information indicative of the item that it is associated with such as the type of item, the price, the number of units available, and the item classification. Other information may also be included in the packets.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A computer-implemented method comprising:
receiving a work request indicative of at least one of: a first item or one or more work request parameters, wherein the first item is one of a plurality of items stored in an item-storage environment, and wherein each item is associated with a co-located identifier device; and
in response to receipt of the work request:
identifying, by a processor, the first item;
determining, by the processor, a target location corresponding to the first item;

selecting, by the processor, a first unmanned aerial vehicle (UAV) from a plurality of encoder UAVs available for deployment in the item-storage environment, wherein each encoder UAV comprises an encoder device configured to encode data to the identifier devices associated with the plurality of items; and causing the first UAV to: (a) travel to the target location, and (b) while hovering at or near to the target location, encode particular identification data to the identifier device associated with the first item, wherein the particular identification data comprises at least the work request parameters.

2. The method of claim 1, further comprising:
causing the first UAV to: (c) while hovering at or near to the target location, determine a precise location of the item, and (d) communicate the precise location to a computer control system.

3. The method of claim 2, further comprising:
selecting, by the processor, from a plurality of collector UAVs, a second UAV to retrieve the first item from the precise location;
causing the second UAV to: (a) travel to the precise location, and (b) while hovering at or near to the target location, retrieve the item.

4. The method of claim 2, further comprising:
selecting, by the processor, from a plurality of robotic devices, a robotic device to retrieve the first item from the precise location.

5. The method of claim 4, further comprising:
causing the selected robotic device to: (a) travel to or near to the precise location, (b) read data from the identifier device associated with the first item, and (c) while the robotic device is at or near to the precise location, cause the robotic device to retrieve the first item.

6. The method of claim 1, wherein the device associated with the first item is a Radio-Frequency Identification (RFID) tag, and wherein the encoder is an RFID encoder.

7. The method of claim 6, wherein the RFID tag is attached to the first item.

8. The method of claim 1, wherein the identifier device associated with the first item is Electronic Shelf Label (ESL), and wherein the encoder is an ESL encoder.

9. The method of claim 8, wherein the ESL is attached to the rack.

10. The method of claim 1, wherein the work request is further indicative of a work request type.

11. The method of claim 10, wherein the work request type is order fulfillment, and wherein the work request parameters comprise at least order data, wherein the order data comprises an order number, a customer ID, a time of order, and an order fulfillment deadline.

12. A non-transitory computer readable medium having stored therein instructions that are executable to cause a processor to perform functions comprising:
receiving a work request indicative of at least one of: a first item or one or more work request parameters, wherein the first item is one of a plurality of items stored in an item-storage environment, and wherein each item is associated with a co-located identifier device; and
in response to receipt of the work request:
identifying, by a processor, the first item;
determining, by the processor, a target location corresponding to the first item;
selecting, by the processor, an unmanned aerial vehicle (UAV) from a plurality of UAVs available for deployment in the item-storage environment, wherein each UAV comprises an encoder device configured to encode data to the identifier devices associated with the plurality of items; and causing the selected UAV to: (a) travel to the target location, and (b) while hovering at or near to the target location, encode particular identification data to the identifier device associated with the item, wherein the particular identification data comprises at least the work request parameters.

13. The non-transitory computer readable medium of claim 12, further having stored therein instructions that are executable to cause a processor to perform functions comprising:
causing the selected UAV to: (c) while hovering at or near to the target location, determine a precise location of the first item, and (d) communicate the precise location to a control computing system.

14. The non-transitory computer readable medium of claim 13, further having stored therein instructions that are executable to cause a processor to perform functions comprising:
selecting, by the processor, from a plurality of robotic devices, a robotic device to retrieve the first item from the precise location.

15. The non-transitory computer readable medium of claim 14, further having stored therein instructions that are executable to cause a processor to perform functions comprising:
causing the selected robotic device to: (a) travel to or near to the precise location, (b) read data from the identifier device associated with the first item, and (c) while the robotic device is at or near to the precise location, cause the robotic device to retrieve the first item.

16. The non-transitory computer readable medium of claim 12, wherein the identifier device associated with the first item is a Radio-Frequency Identification (RFID) tag, and wherein the encoder is an RFID encoder.

17. The non-transitory computer readable medium of claim 16, wherein the RFID tag is attached to the first item.

18. A system comprising:
a plurality of UAVs located in an item-storage environment,
wherein a plurality of items are stored in the item-storage environment,
wherein each item is associated with a co-located identifier device,
wherein each UAV comprises an encoder device configured to encode data to the identifier devices associated with the plurality of items, and
wherein each UAV is operable to: (a) travel to a target location corresponding to a first item of the plurality of items, and (b) while hovering at or near to the target location, encode particular identification data to the identifier device associated with the first item;
a plurality of robotic devices operable to: (a) travel to or near to a precise location of the first item, (b) read data from the identifier device associated with the first item (c) at or near to the precise location, retrieve the first item;
a controller configured to:
receive a work request indicative of at least one of: the first item or one or more work request parameters; and
in response to receipt of the work request:
identify the first item;
determine the target location corresponding to the first item;

select an unmanned aerial vehicle (UAV) from the plurality of UAVs available for deployment in the item-storage environment; and cause the selected UAV to: (a) travel to the target location, and (b) while hovering at or near to the target location, encode the particular identification data to the identifier device associated with the first item, wherein the particular identification data comprises at least the work request parameters.

19. The system of claim 18, wherein the controller is further configured to:

cause the selected UAV to: (d) while in the hover flight mode at or near to the target location, determine the precise location of the first item, and (e) communicate the precise location to the controller.

20. The system of claim 18, wherein the controller is further configured to:

select from the plurality of robotic devices, a robotic device to retrieve the first item from the precise location.

21. The system of claim 20, wherein the controller is further configured to:

cause the selected robotic device to: (a) travel to or near to the precise location, (b) read data from the identifier device associated with the first item, and (c) while the robotic device is at or near to the precise location, cause the robotic device to retrieve the first item.

22. The system of claim 18, wherein the identifier device associated with the first item is a Radio-Frequency Identification (RFID) tag, and wherein the encoder is an RFID encoder.

23. The system of claim 22, wherein the RFID tag is attached to the item.

* * * * *